Sept. 20, 1966    A. HEINZ    3,274,391
APPARATUS FOR MONITORING THE SPACING BETWEEN A PLURALITY
OF ELEMENTS ARRANGED IN A SERIES
Filed June 1, 1964    14 Sheets-Sheet 1

INVENTOR
A. HEINZ
BY
W.M. Kain
ATTORNEY

Sept. 20, 1966  A. HEINZ  3,274,391
APPARATUS FOR MONITORING THE SPACING BETWEEN A PLURALITY
OF ELEMENTS ARRANGED IN A SERIES
Filed June 1, 1964  14 Sheets-Sheet 2

DISTANCE ALONG PREDETERMINED PATH 74

Sept. 20, 1966　　　　　　　　A. HEINZ　　　　　　3,274,391
APPARATUS FOR MONITORING THE SPACING BETWEEN A PLURALITY
OF ELEMENTS ARRANGED IN A SERIES
Filed June 1, 1964　　　　　　　　　　　　　　14 Sheets-Sheet 3

Sept. 20, 1966 A. HEINZ 3,274,391
APPARATUS FOR MONITORING THE SPACING BETWEEN A PLURALITY
OF ELEMENTS ARRANGED IN A SERIES
Filed June 1, 1964 14 Sheets-Sheet 4

Sept. 20, 1966 A. HEINZ 3,274,391
APPARATUS FOR MONITORING THE SPACING BETWEEN A PLURALITY
OF ELEMENTS ARRANGED IN A SERIES
Filed June 1, 1964 14 Sheets-Sheet 10

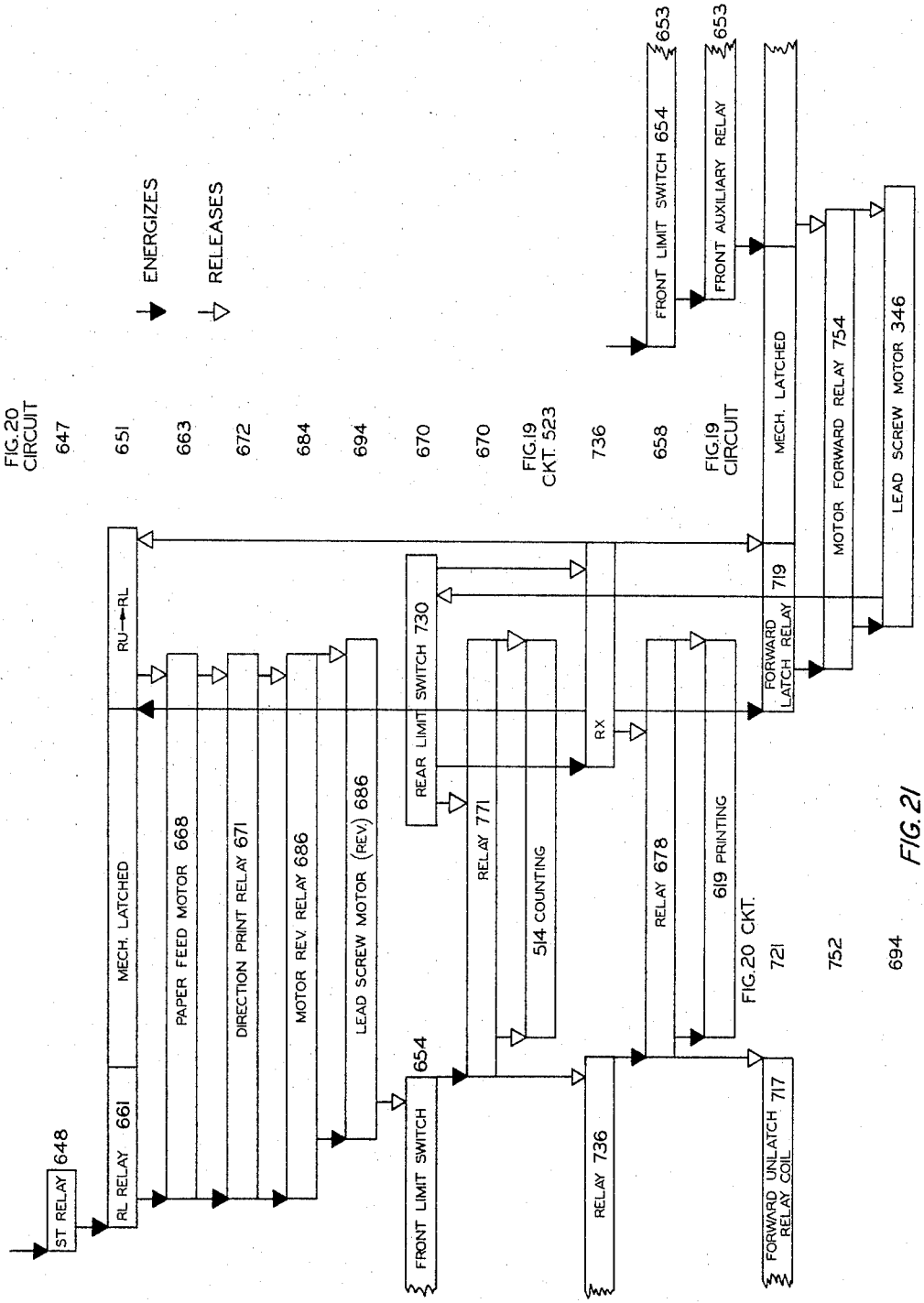

United States Patent Office 3,274,391
Patented Sept. 20, 1966

1

3,274,391
APPARATUS FOR MONITORING THE SPACING BETWEEN A PLURALITY OF ELEMENTS ARRANGED IN A SERIES
Alfred Heinz, Raritan Township, Hunterdon County, N.J., assignor to Western Electric Company Incorporated, New York, N.Y., a corporation of New York
Filed June 1, 1964, Ser. No. 371,617
15 Claims. (Cl. 250—219)

This invention relates to apparatus for monitoring the spacing between a plurality of elements arranged in a series, and more particularly, to apparatus for testing a transparent cable to determine if equal distances are provided between generally parallel, opaque wires of the cable.

In manufacturing operations, it is often necessary to determine the relative position of various elements. When the elements are numerous and are positioned in closely spaced relationship, standard, manually performed gaging operations are tedious, time consuming, and subject to inherent inaccuracies. In the past, attempts to increase gaging accuracy have been made by providing optical facilities for projecting enlarged images of the elements for observation by an operator. Accurate observation of the projected images requires a high degree of skill and judgment and moreover, becomes extremely tedious when performed for an appreciable length of time.

More particularly, in the manufacture of transparent cable, such as twistor cable used in twistor matrix or permanent magnet memory array devices, numerous pairs (45 pairs, for example) of generally parallel, opaque conductors, such as wires, are embedded in laminated polyethylene sheets. The wires of each pair may be spaced by 20 mils, for example, and the spacing between pairs may be 100 mils, for example. Additionally, each cable may be as much as 72 feet long and must be monitored or gaged at frequent intervals, such as every one-half foot, along its length. The memory characteristics of the twistor matrix devices are dependent to a significant degree upon maintaining precise spacing of the wires relative to minute magnets; hence such spacing must be determined accurately and consistently to insure conformity of the memory characteristics to the manufacturing standards.

When such optical projection facilities are employed during the course of a normal workday to determine the spacing between the pairs of wires along the 72 foot length of many such transparent ribbon cables, the tedium attending such operations renders it increasingly difficult as the workday progresses to maintain required standards of gaging accuracy.

Research, conducted in an endeavor to provide extremely accurate and consistent apparatus for monitoring the spacing between a plurality of elements arranged in a series, indicates that the rate of travel of an optical scanning facility for generating signals indicative of the spacing of the elements may be precisely related to the operation of a recorder so that the signals render the recorder effective to produce an accurate and consistent record of the spacing of the elements.

It is an object of the present invention to provide new and improved apparatus for monitoring the spacing between a plurality of elements arranged in a series.

Another object of the present invention resides in the provision of apparatus for testing a transparent cable to determine if equal distances are provided between generally parallel, opaque wires of the cable.

Still another object of the present invention resides in the provision of facilities coordinating the advancement of a scanner unit relative to a plurality of elements arranged in a series, to the operation of apparatus for conditioning a record for reception of marks indicative of the spacing of the elements.

A further object of the present invention is to provide facilities for conditioning a record for reception of marks indicative of the spacing of a plurality of elements arranged in a series, in conjunction with instrumentalities for scanning the elements and producing signals which cause marks to be applied to the conditioned record.

A still further object of the present invention resides in the provision of instrumentalities for focusing a beam of light on a common plane of a laminated, transparent sheet to facilitate determination of the relative position of opaque conductors embedded in the sheet and centered on the common plane.

With these and other objects in view, the present invention contemplates apparatus for monitoring the spacing between a plurality of opaque elements, such as wires, spaced in a given direction and mounted in a common plane. A light beam focused on the common plane and the spaced wires are moved relatively at a given rate in the given direction so that the spaced wires produce a series of modifications in the light beam. A record is cyclically conditioned at a rate proportional to the given rate for reception of marks each time a properly spaced wire modifies the light beam. A device responsive to the modified light beam applies the marks to the conditioned record to indicate the relative spacing of the wires.

These and other objects of the present invention will become apparent upon reference to the following description and to the accompanying drawings illustrating a preferred embodiment thereof in which.

Figure 24:
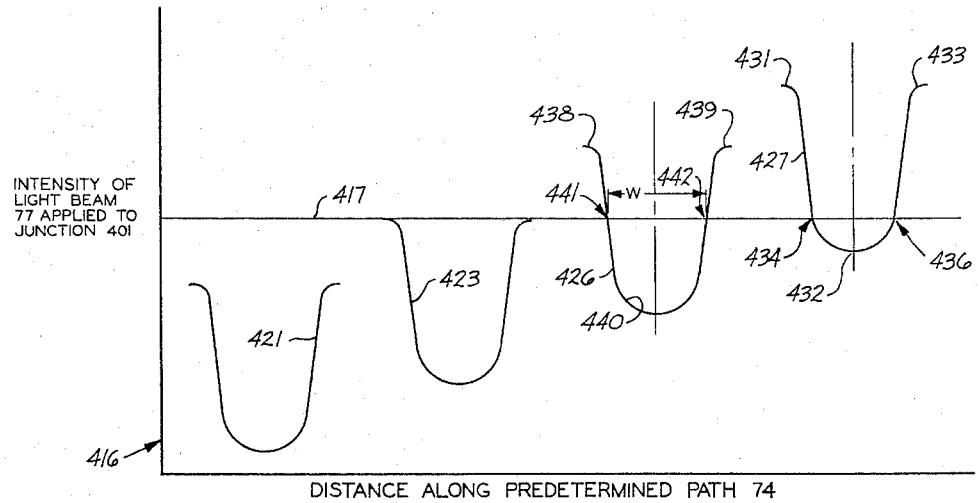
Figure 22:
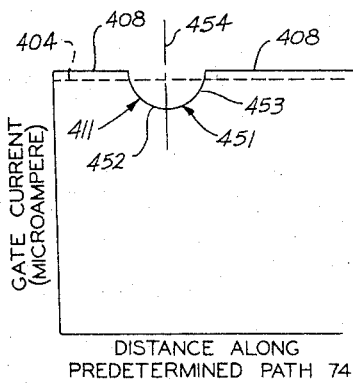
Figure 23:
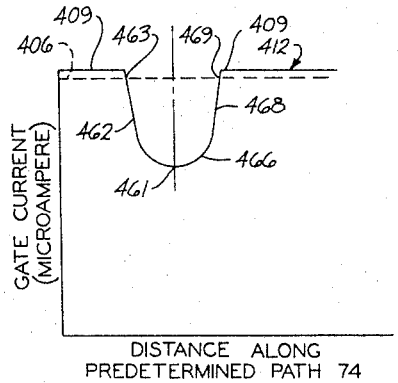
Figure 8:
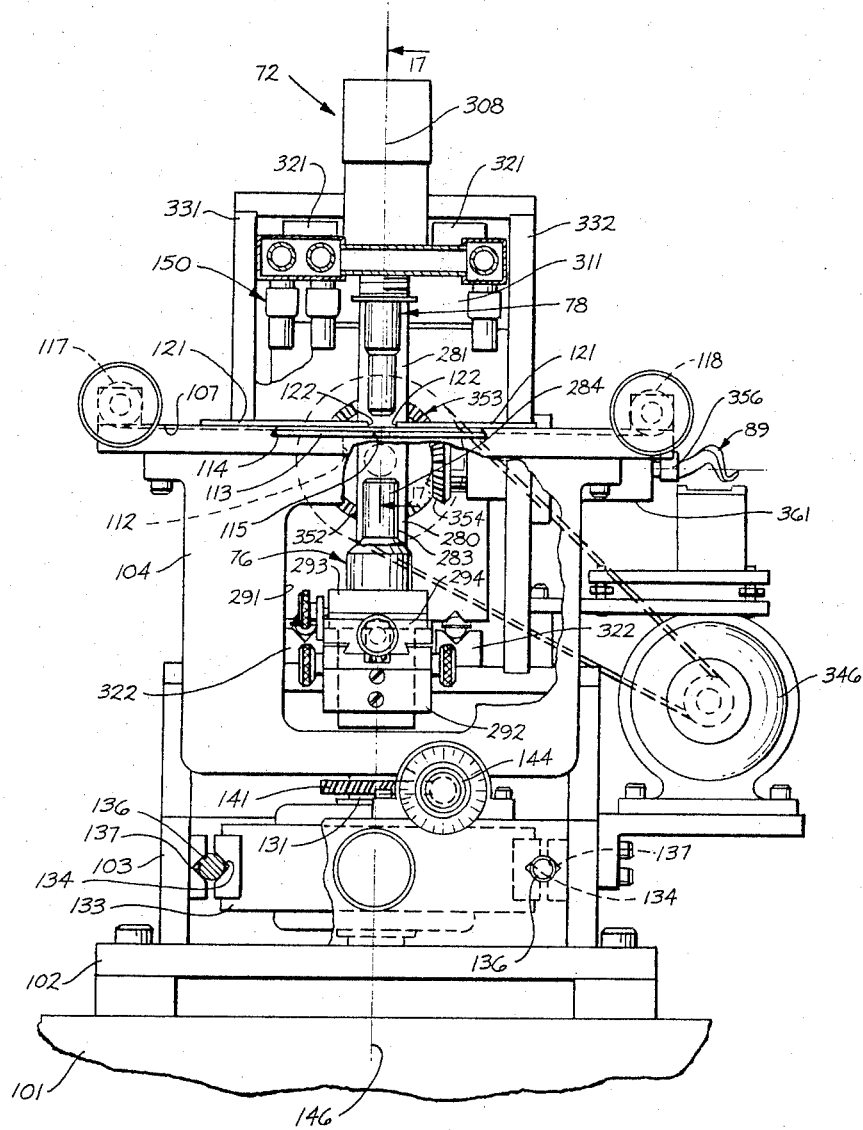
FIG. 8 is a cross-sectional view taken along line 8—8 of FIG. 7 showing a scanner unit mounted on the carriage for monitoring the twistor cable mounted on the table.
Figures 10, 12:
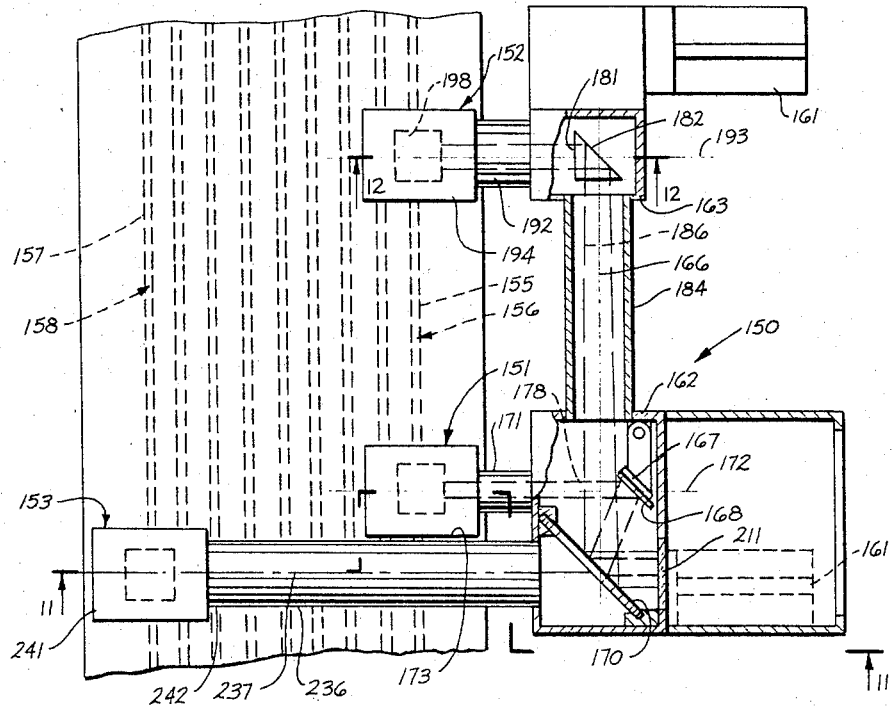
FIG. 10 is a cross-sectional view taken along line 10—10 of FIG. 7 showing an optical alignment system for indicating that a longitudinal axis of the twistor cable is positioned perpendicular to the predetermined path of the scanner unit.
Figure 17:
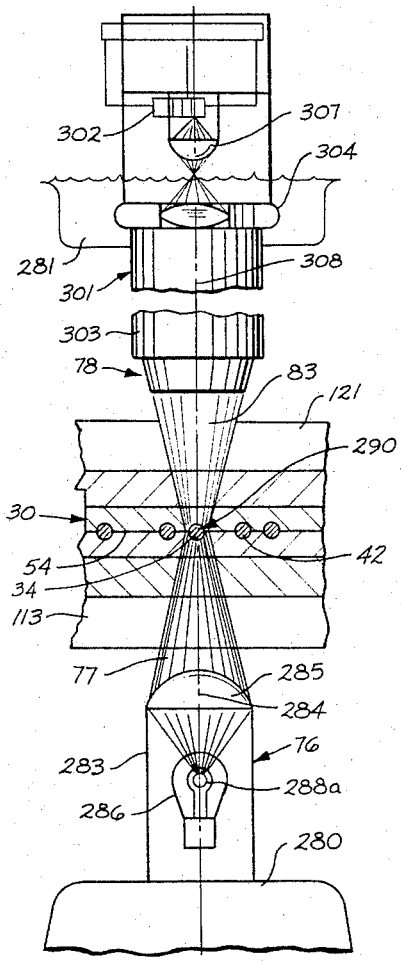
Figure 18:
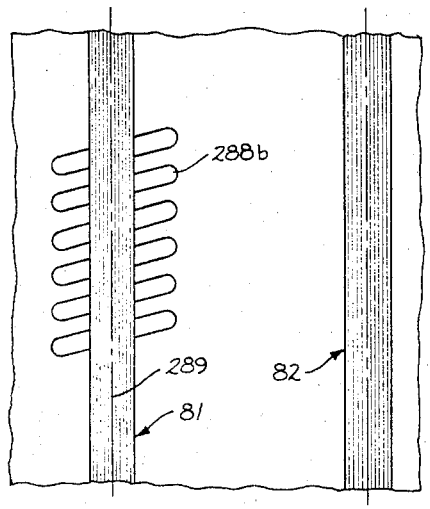
Figure 13:
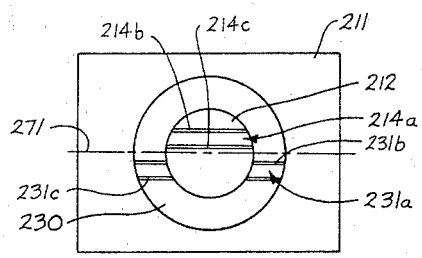
Figure 14:
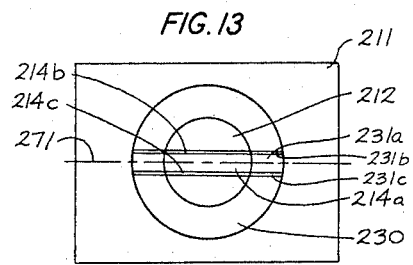
Figure 15:
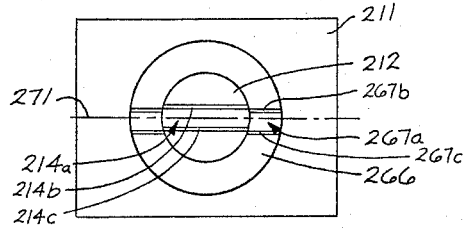
Figure 16:
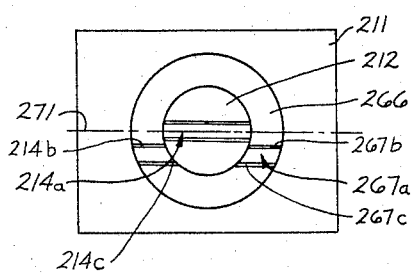
Figure 19:
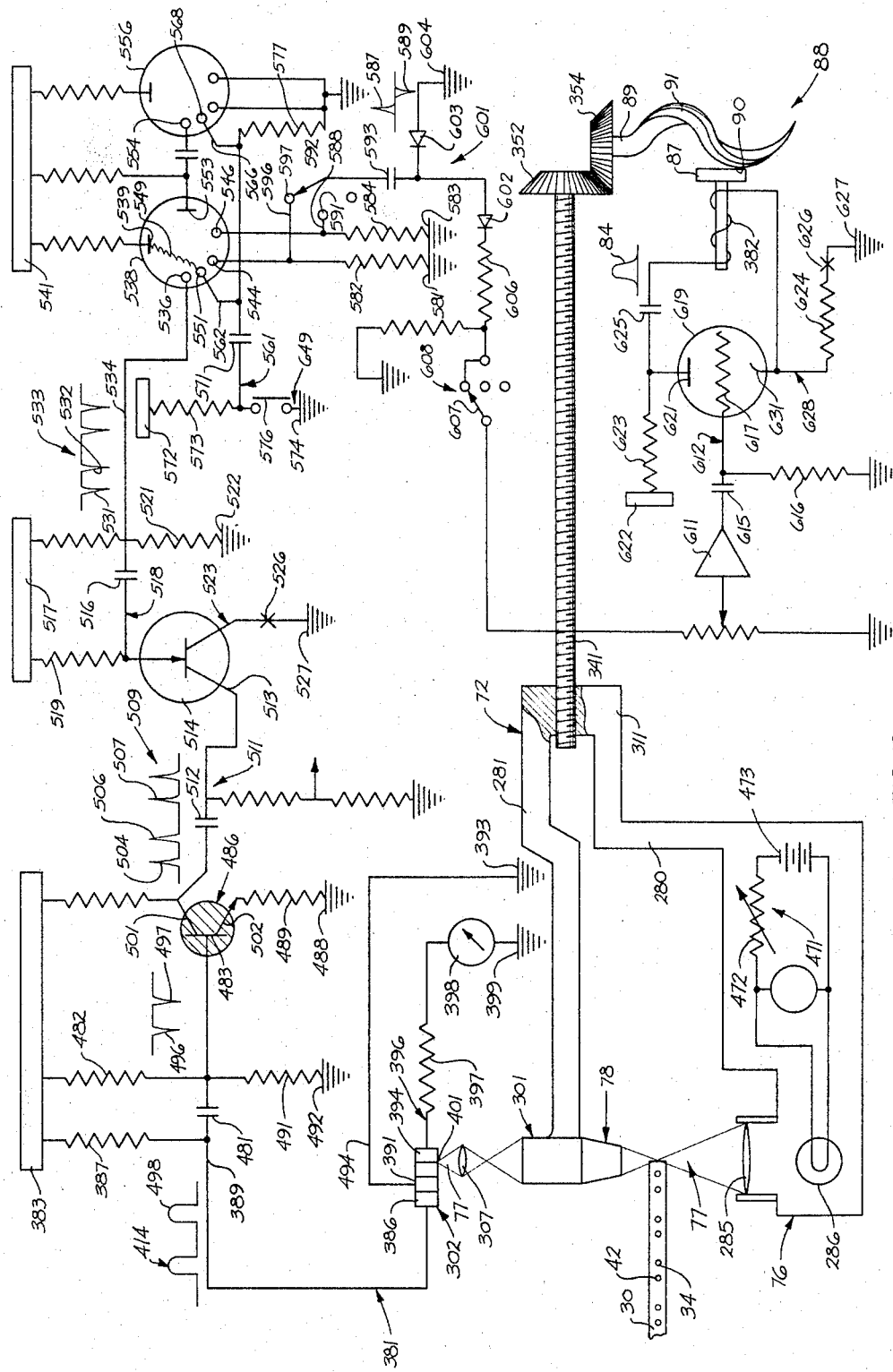
Figure 20:
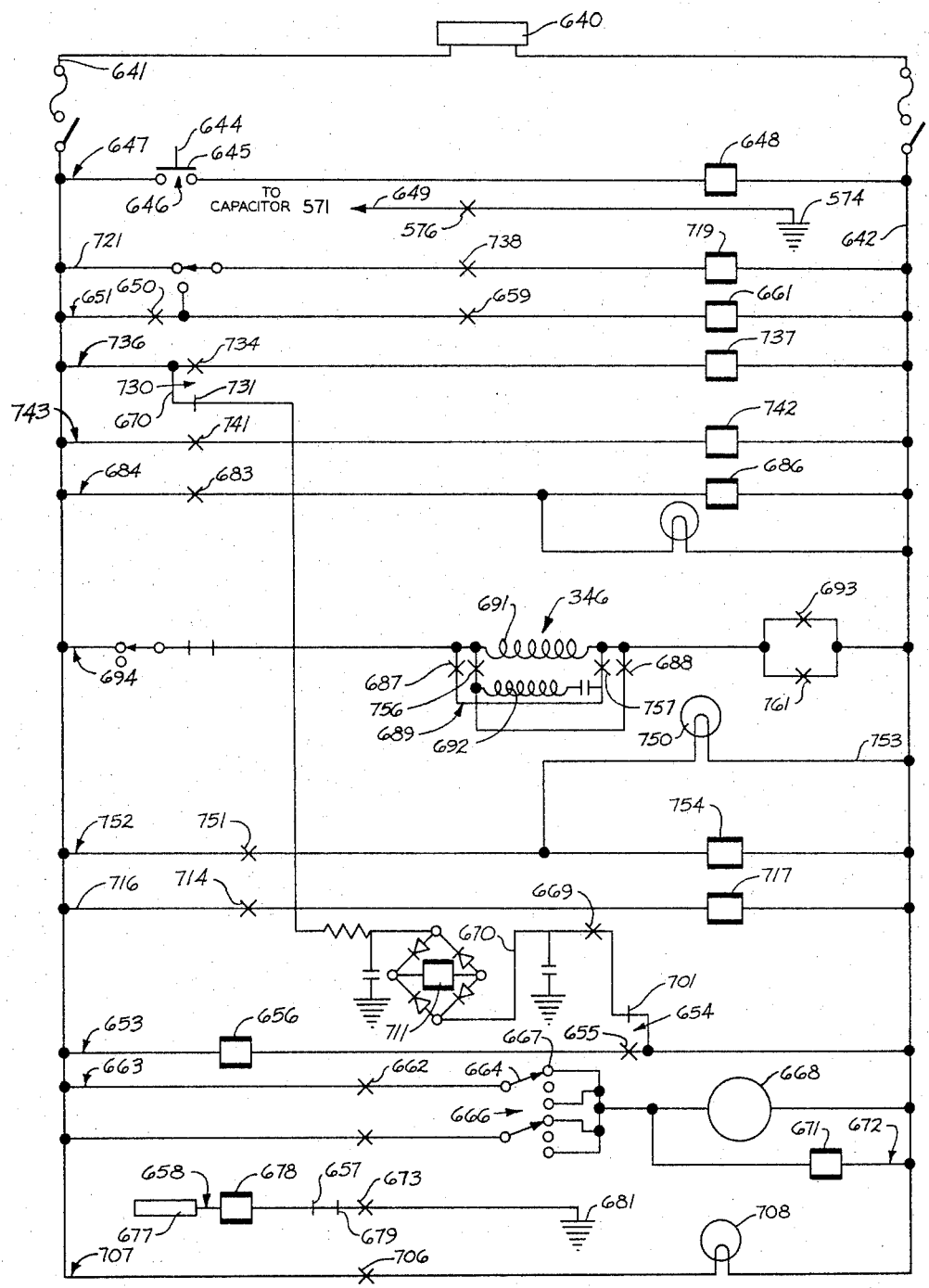
Figure 25:
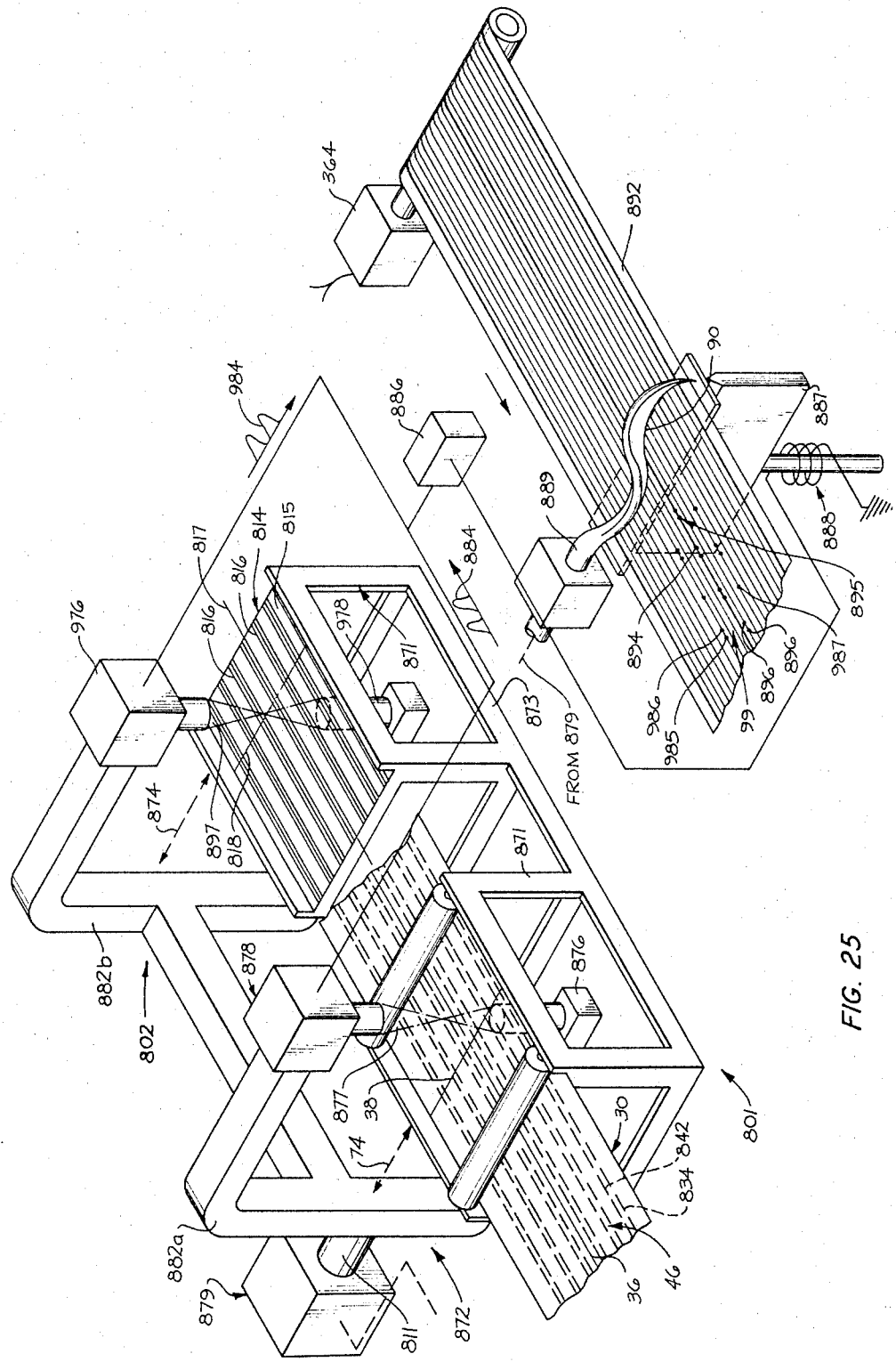

11—11 of FIG. 10 illustrating optical units of the optical alignment system for determining if outer pairs of twistor and return wires are spaced by a nominal distance;

FIG. 12 is a cross-sectional view of an optical unit of the optical alignment system;

FIG. 13 is an elevational view showing a screen of the optical alignment system indicating that the longitudinal axis of the twistor cable is not perpendicular to the predetermined path;

FIG. 14 is an elevational view similar to FIG. 13 showing the screen indicating that the longitudinal axis of the twistor cable is perpendicular to the predetermined path;

FIG. 15 is an elevational view similar to FIG. 13 showing the screen indicating that the outside pairs of twistor and return wires are spaced by a nominal distance;

FIG. 16 is an elevational view similar to FIG. 15 showing the screen illustrating that the outside pairs of wires are spaced by an unacceptable distance;

FIG. 17 is a cross-sectional view taken along line 17—17 of FIG. 8 showing a source of radiation for projecting a focused beam of light onto the common plane of the twistor cable and a light sensing head of the scanner unit;

FIG. 18 is a view of an image projected onto the light sensing head including an image of a twistor wire partially blocking an image of a filament of the source of radiation;

FIG. 19 is a schematic diagram of a record control circuit including a phototransistor responsive to light which forms the image shown in FIG. 18;

FIG. 20 is a schematic diagram of a detached contact, motor control circuit for controlling the operational sequence of the apparatus shown in the other views;

FIG. 21 is a sequence chart illustrating the operational sequence of the apparatus shown in the other views;

FIGS. 22 and 23 are graphs of gate current of the phototransistor plotted against the distance of the scanner unit along the predetermined path, for two different levels of intensity of the light emitted by the filament of the source of radiation;

FIG. 24 is a graph of intensity of a light beam applied to the phototransistor plotted as a function of the distance of the scanner unit along the predetermined path; and FIG. 25 is a perspective view of an embodiment constructed according to the principles of the present invention illustrating first and second scanner units moved by the carriage relative to a standard and to the twistor cable, respectively, for providing marks on the strip of paper to indicate the relative spacing of the wires and providing limit marks on the strip of paper during a single scanning operation.

Figure 3:
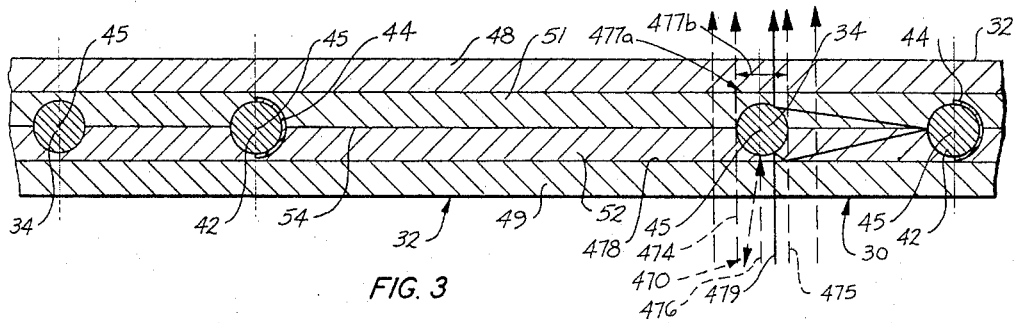
FIG. 3 is a cross-sectional view taken on line 3—3 of FIG. 2 illustrating the return and twistor wires mounted in a common plane in the transparent layers of the twistor cable.
Figure 2:
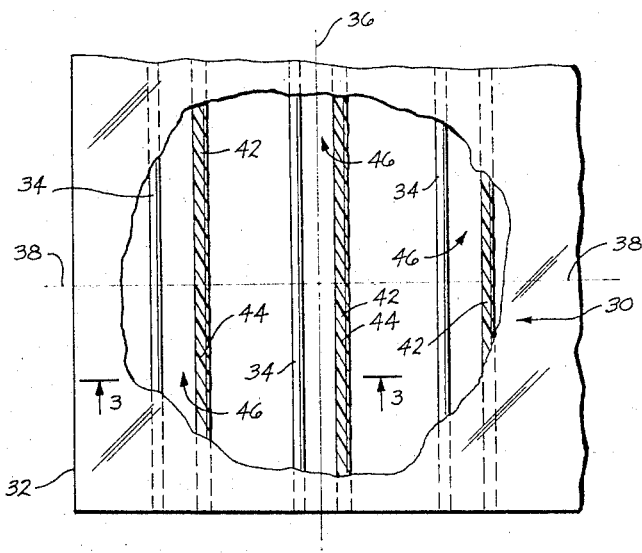
FIG. 2 is a plan view of an article, such as a twistor cable used in a twistor matrix memory device, illustrating adjacent pairs of return and twister wires arranged in a series in transparent layers of the twistor cable.

Referring first to FIGS. 2 and 3, an article, such as a twistor or ribbon-type cable 30, which may be tested by apparatus constructed according to the principles of the present invention, is shown in the form of a light-transparent ribbon 32 having a plurality of parallel, opaque, electrically conductive members, such as return wires 34—34, embedded therein parallel to a longitudinal axis 36 and perpendicular to a transverse axis 38 of the ribbon. A plurality of parallel, opaque, electrically conductive strands, such as twistor wires 42—42 provided with a helical wrapping of magnetic twistor tape 44 thereon, are embedded in the ribbon 32 parallel and adjacent to the return wires 34—34 to form pairs 46 of twistor and return wires.

The ribbon 32 may be provided with respective overall width and thickness dimensions, such as 6.0 inches and 7 mils, for example, and includes four layers. For mechanical protection, two outer layers 48 and 49 (FIG. 3) are a plastic, such as polyethyleneterephthalate, sold under the trademark "Mylar," by the Du Pont Company, whereas two inner layers 51 and 52 are a thermoplastic material, such as polyethylene. The respective return and twistor wires 34—34 and 42—42 may be 3 mil copper wires, for example, and are embedded in the respective polyethylene layers 51 and 52 with the centers 45—45 of the wires in a common or focal plane 54 (FIG. 3). The respective return and twistor wires 34—34 and 42—42 of each pair 46 of wires are positioned in the direction of the transverse axis 38 on nominal 0.020 inch centers, for example, and the twistor wires 42—42 of each pair, are nominally spaced by 0.100 inch, for example.

The apparatus of the present invention may be adapted to monitor the spacing between each of the respective return and twistor wires 34—34 and 42—42 of the twistor cable 30. For clarity and ease of description, however, the following description relates to monitoring of the spacing between only the twistor wires 42—42 of the twistor cable. The apparatus monitors the spacing between the twistor wires 42—42 of each pair 46 of twistor and return wires to determine whether the spacing conforms to the nominal spacing, or is within acceptable deviations therefrom, such as plus or minus 3 mils.

Figure 4:
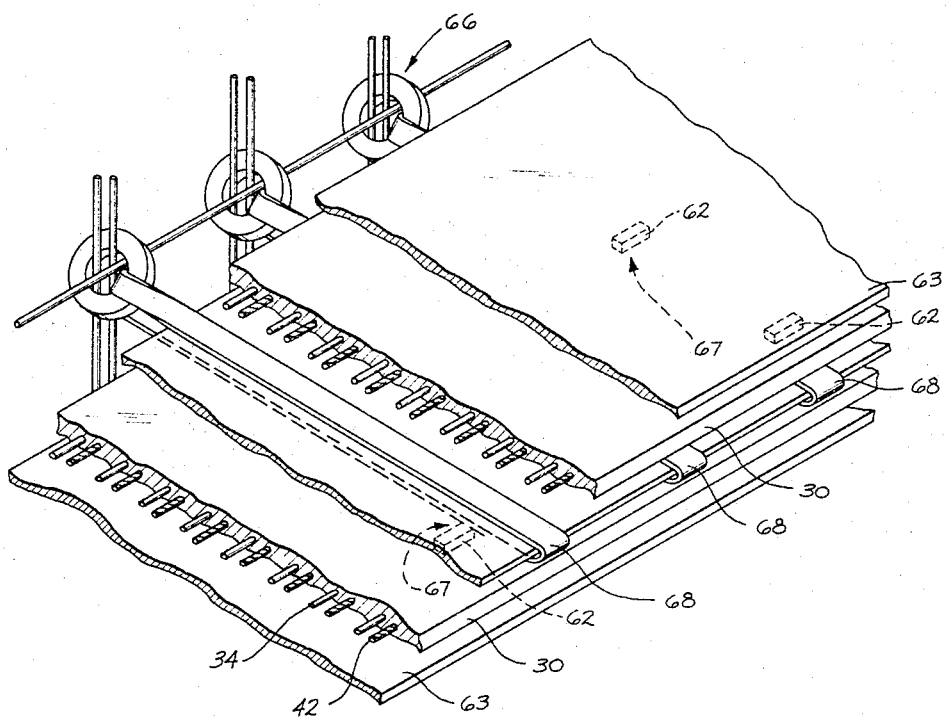
FIG. 4 is a perspective view illustrating the twistor cable shown in FIG. 2 mounted in a twistor matrix memory device.

The twistor cable 30 may be utilized in a twistor matrix memory device 61 (FIG. 4) of the general type described in an article entitled "A Twistor Matrix Memory for Semipermanent Information" by Duncan H. Looney, published in the Proceedings Western Joint Computer Conference, 1959. Referring to FIG. 4, there is shown an embodiment of the twistor matrix memory device 61 designed for computers which require random access to stored information that is changed very infrequently. The device 61 shown in FIG. 4 includes permanent magnets 62—62 arranged in a given pattern on a card 63 for storing the information. The presence or absence of one of the permanent magnets 62 is sensed nondestructively by one of the twistor wires 42 which is wrapped with the magnetic twistor tape 44 adjacent to the location of the permanent magnets 62. A stored word is read by a linear selection system 66 using a biased core access switch.

As noted in the article, a number of factors must be considered in the design of the twistor matrix memory device 61. One factor noted is that the permanent magnets 62—62 must be registered accurately with bit locations 67 defined by the twistor wires 42—42 and elongated word solenoids 68 extending perpendicular to the twistor wires 42—42. Because the permanent magnets 62—62 are minute and the twistor wires 42—42 are fine, it may be appreciated that the spacing of the twistor wires 42—42 within the acceptable limits is critical to such accurate registration of the permanent magnets 62—62, the twistor wires 42—42 and the bit locations 67—67.

Figure 1:
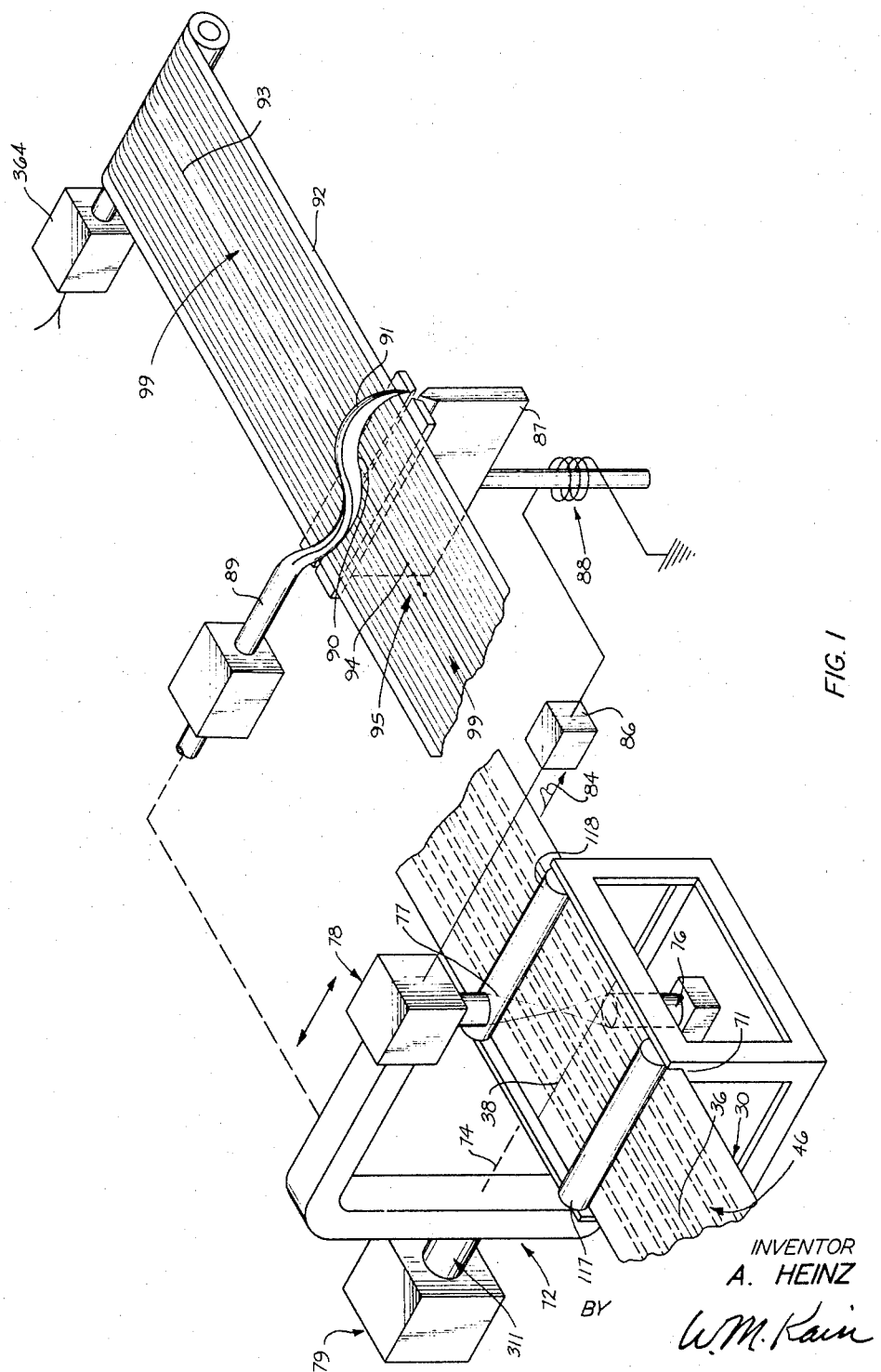
FIG. 1 is a perspective view of an apparatus constructed according to the principles of the present invention for monitoring the spacing between a plurality of elements, such as wires, arranged in a series.

The apparatus of the present invention for monitoring the spacing between the twistor wires 42—42 is shown schematically in FIG. 1 including a support, such as a flat, light-transparent table 71, for mounting the twistor cable 30 with the pairs 46 of twistor and return wires in the common plane 54 (FIG. 3). A scanner unit 72 is mounted for movement relative to the twistor cable 30 along a predetermined path 74. The twistor cable 30 may be adjusted relative to the scanner unit 72 by rotating the table 71 to align the transverse axis 38 of the cable 30 parallel to the predetermined path 74. The table 71 may also be adjusted in the direction of the predetermined path 74 to place an outermost one of the pairs 46 in a predetermined location.

The scanner unit 72 includes a source of radiation, such as a light source 76, which is mounted on one side of the twistor cable 30 for projecting a focused beam 77 of light on the common plane 54. Mounted on the other side of the twistor cable 30 and in vertical alignment with the light source 76, is a light sensing head 78 of the scanner 72 that is responsive to the beam 77 of light focused on the common plane 54. A precision drive mechanism 79 drives the scanner unit 72 relative to the table 71 in the predetermined path 74 and at a given rate of advancement so that both the light source 76 and the light sensing head 78 move relative to the twistor cable 30 at a given rate. The relative movement causes the respective return and twistor wires 34—34 and 42—42 to successively intercept the focused light beam 77 so that successive silhouettes 81 and 82 (FIG. 18) of the respective return and twistor wires 34—34 and 42—42 are projected toward the light sensing head 78. The respective silhouettes 81 and 82 of the return and twistor wires 34—34 and 42—42 are projected as a series of shadows 83 (FIG. 17), and in response to each shadow 83 of the series, the light sensing head 78 generates a signal 84 (FIGS. 1 and 19) which renders a record control circuit 86 (FIGS. 1 and 19) effective to actuate a printer bar 87 of a recording unit 88.

Figure 5:
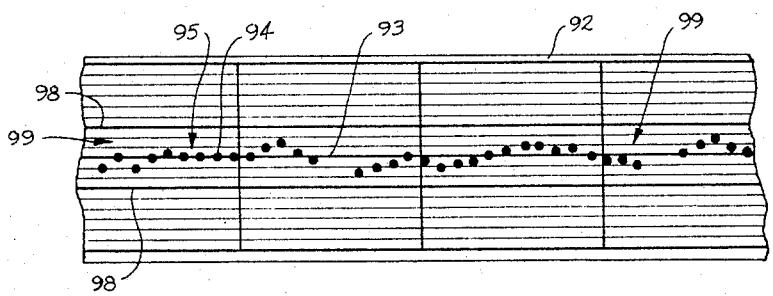
FIG. 5 is a plan view of a strip of pressure sensitive recording paper illustrating a first series of marks indicative of acceptable spacing of the return and twistor wires.
Figure 6:
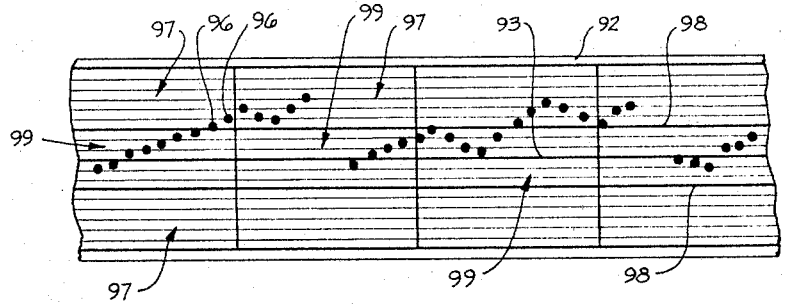
FIG. 6 is a plan view similar to FIG. 5 showing a second series of marks indicating unacceptable spacing of the return and twistor wires.

The precision drive mechanism 79 also drives or rotates a helical anvil member 89 of the recording unit 88 at a selected rate which is proportional to the given rate of advancement of the scanner unit 72 along the predetermined path 74 across the swistor cable 30. Upon rotation of the helical anvil member 89, a peripheral surface 91 thereof advances transversely across a strip 92 of pressure sensitive recording paper (see also FIGS. 5 and 6) which is provided with a longitudinal datum line 93. The strip 92 of pressure sensitive recording paper is advanced in a direction parallel to the datum line 93 through a space which is normally provided between the helical anvil member 89 and the printer bar 87.

The design of the helical anvil member 89 and the rate of rotation thereof are related to the given rate of advancement of the scanner unit 72 across the twistor cable 30 so that a portion 90 of the peripheral surface 91 is in alignment with the datum line 93 substantially simultaneously with the time that the light beam 77 is focused on a twistor wire 42 which is positioned in conformity with the nominal spacing. Such twistor wire 42 intercepts the focused light beam 77 and causes the light sensing head 78 to generate the signal 84. In response to the signal 84, the record control circuit 86 causes the printer bar 87 to advance toward the aligned portion 90 of the peripheral surface 91 of the helical anvil member 89 so that the strip 92 of pressure sensitive recording paper receives a mark 94 which is superimposed on the datum line 93.

It may be understood that when the twistor wires 42—42 are nominally spaced, successive signals 84—84 generated in response to the successive shadows 83 (FIG. 17) of the twistor wires 42—42, cause the printer bar 87 and the helical anvil member 89 to produce a series 95 (FIG. 5) of the marks 94 on the strip 92 of pressure sensitive recording paper in a generally straight line path that is superimposed on the datum line 93. However, if the spacing of the twistor wires 42—42 differs from the nominal spacing, the twistor wires 42—42 do not intercept the focused light beam 77 simultaneously with the alignment of the portion 90 of the peripheral surface 91 with the datum line 93. Thus, the signals 84—84 are generated by the light sensing head 78 either before or after the portion 90 of the peripheral surface 91 of the helical anvil member 89 is aligned with the datum line 93, so that actuation of the printer bar 87 causes marks 96—96 (FIG. 6) to be produced on areas or sections 97—97 of the strip 92 which are displaced transversely from the datum line 93. A tolerance line 98 may be provided on each side of the datum line 93 to define sections 99—99 of the strip 92 on which the marks 94 may be received to indicate acceptable amounts of displacement from the datum line 93. It may be understood that observation of whether or not the marks 94 are within or between the tolerance lines 98 indicates whether or not the spacing of the twistor wires 42—42 is within acceptable limits.

Figure 7:
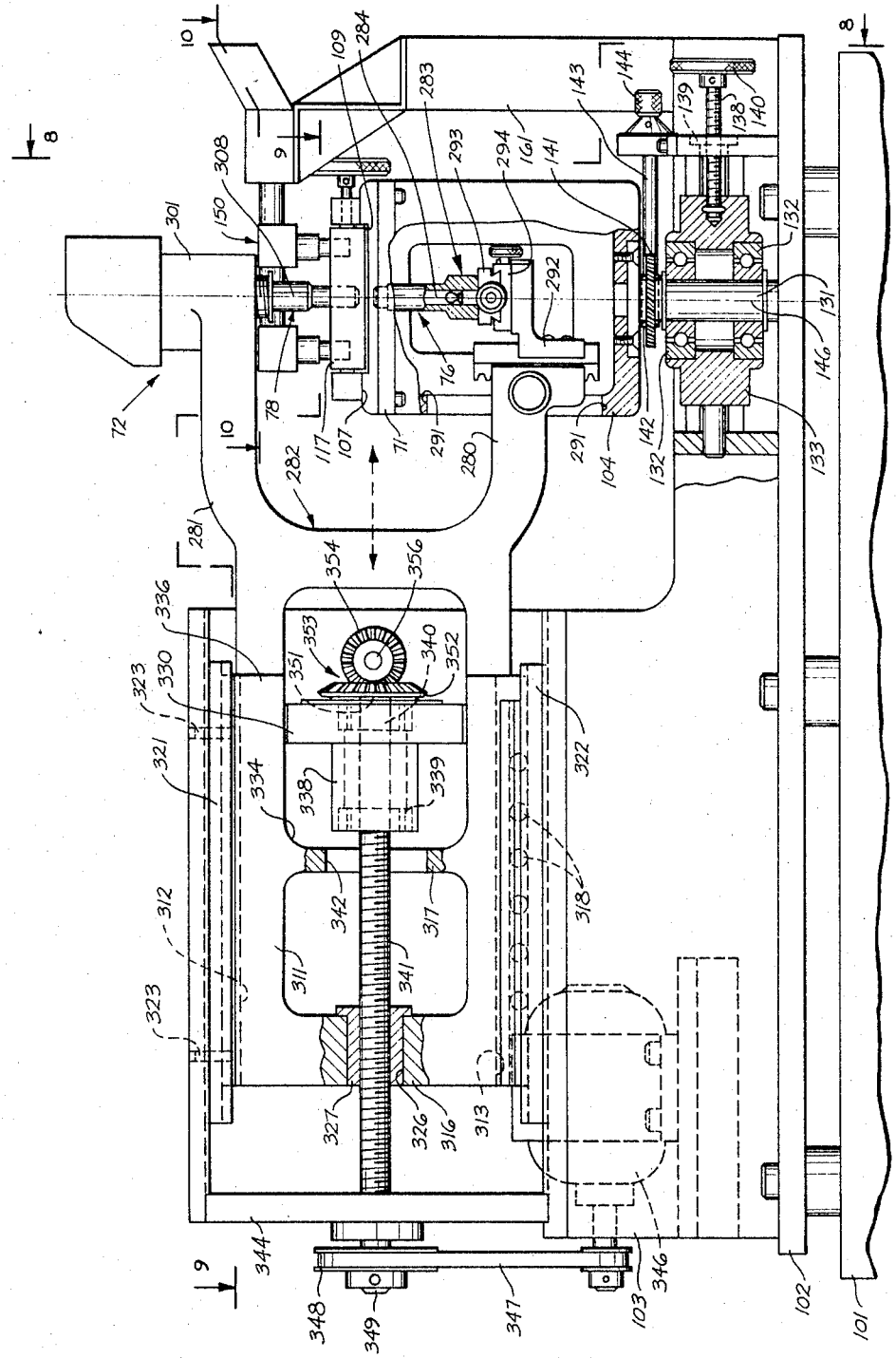
FIG. 7 is a side elevation, cross-sectional view of the apparatus shown in FIG. 1 illustrating a carriage movable along a predetermined path relative to a table.
Figure 9:
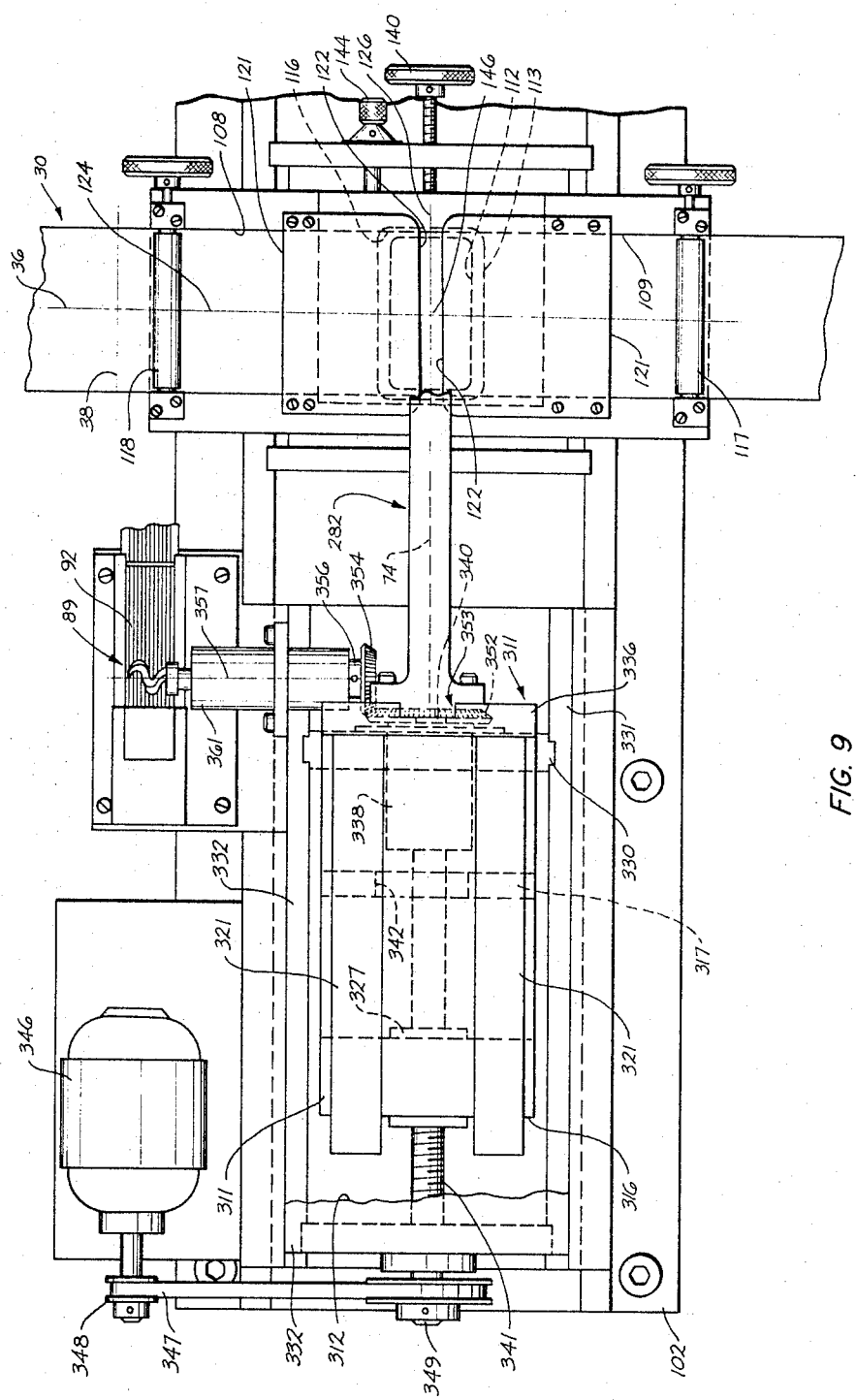
FIG. 9 is a cross-sectional view taken along line 9—9 of FIG. 7 illustrating a recording mechanism operated by the scanner unit for applying the marks to the strip of paper shown in FIGS. 5 and 6.

Referring in detail to FIGS. 7, 8, and 9, the apparatus of the present invention is shown including a rigid bed 101 which provided a vibrationless mount for the apparatus. A main frame 102 secured to the bed 101 supports a carriage frame 103 on one end thereof and on the other end thereof a housing 104 for supporting the table 71. The table 71 is mounted on the housing 104 and is provided with an upper surface 107 which extends in a plane parallel to the predetermined path 74 of the scanner unit 72. The upper surface 107 of the table 71 is channelled to provide first and second spaced recesses 108 and 109, respectively (FIG. 9), for reception of the twistor cable 30. A cut-out portion or window 112 (FIGS. 8 and 9) extends through the table 71 between the light source 76 and the light sensing head 78. To support the twistor cable 30 while permitting the focused light beam 77 to be projected from the light source 76 to the light sensing head 78, a bed 113 (FIGS. 8 and 9) is provided in a transverse groove 114 (FIG. 8) which surrounds the window 112. The bed 113 is provided with a slot 115 which passes the focused light beam 77 to the light sensing head 78. The bed 113 is also channelled to provide a third recess 116 (FIG. 9) aligned with an intermediate plate with the respective first and second recesses 108 and 109 for receiving the twistor cable 30.

Mounted at opposite ends of the table 71 are resilient clamps, such as cylindrical, rubber, pressure rollers 117 and 118 for holding the twistor cable 30 in the respective first and second recesses 108 and 109 of the table 71 so that the respective twistor and return wires 34—34 and 42—42 are maintained in the common plane 54. To maintain the length of twistor cable 30 which is intermediate the respective rollers 117 and 118 in the respective first and second recesses 108 and 109 and in the third recess 116 of the bed 113, a pair of light-transparent plates or covers 121—121 (FIGS. 8 and 9) are secured to the table 71 overlying the window 112 and the bed 113. Adjacent edges 122—122 of the plates 121—121 are spaced by a distance that is sufficient to avoid interference with the light sensing head 78 and the focused light beam 77 during the scanning operation. As shown in FIG. 9, the respective pressure rollers 117 and 118 and the plates 121—121 hold the twistor cable 30 with the longitudinal axis 36 thereof parallel to a longitudinal axis 124 of the table 71 and with the transverse axis 38 thereof parallel to a transverse axis 126 of the table.

As shown in FIGS. 7 and 8, the housing 104 mounts the table 71 and is secured to a rigid, vertical support shaft 131 mounted by ball bearings 132—132 for rotation on a rigid slide 133 provided with V-shaped guide grooves 134 (FIG. 8). Ball bearings 136—136 are received in the guide grooves 134—134 and in V-shaped grooves 137—137 provided in the carriage frame 103 for precluding vertical movement of the slide 133 while permitting horizontal movement by means of a rotary threaded shaft 138 and a fixed nut 139 (FIG. 7) under the control of a translational control knob 140.

Still referring to FIGS. 7 and 8, a gear 141 keyed to the vertical support shaft 131 meshes with a worm gear 142 which is rotated by a shaft 143 and a rotation control knob 144. Rotation of the rotation control knob 144 is effective to rotate the vertical support shaft 131 so that the table 71 rotates on a vertical axis 146 that is vertically aligned with the light source 76 and the light sensing head 78.

As shown best in FIG. 9, the rotational movement of the table 71 permits movement of the twistor cable 30 around the vertical axis 146 to align the transverse axis 38 of the twistor cable 30 parallel with the predetermined path 74 of travel of the scanner unit 72. Also, the horizontal movement of the table 71 permits transverse movement of the twistor cable 30 to position the outermost of the pairs 46—46 at a predetermined initial position. In such position, the signal 84 will be generated when the portion 90 of the peripheral surface 91 is aligned with the datum line 93 so that the mark 94 (FIG. 5) is superimposed on the datum line 93 of the strip 92. Such alignment may be established and checked by an optical alignment system 150 shown in part in FIGS. 7 and 8, and disclosed in detail in FIGS. 9 through 14, inclusive.

Figure 11:
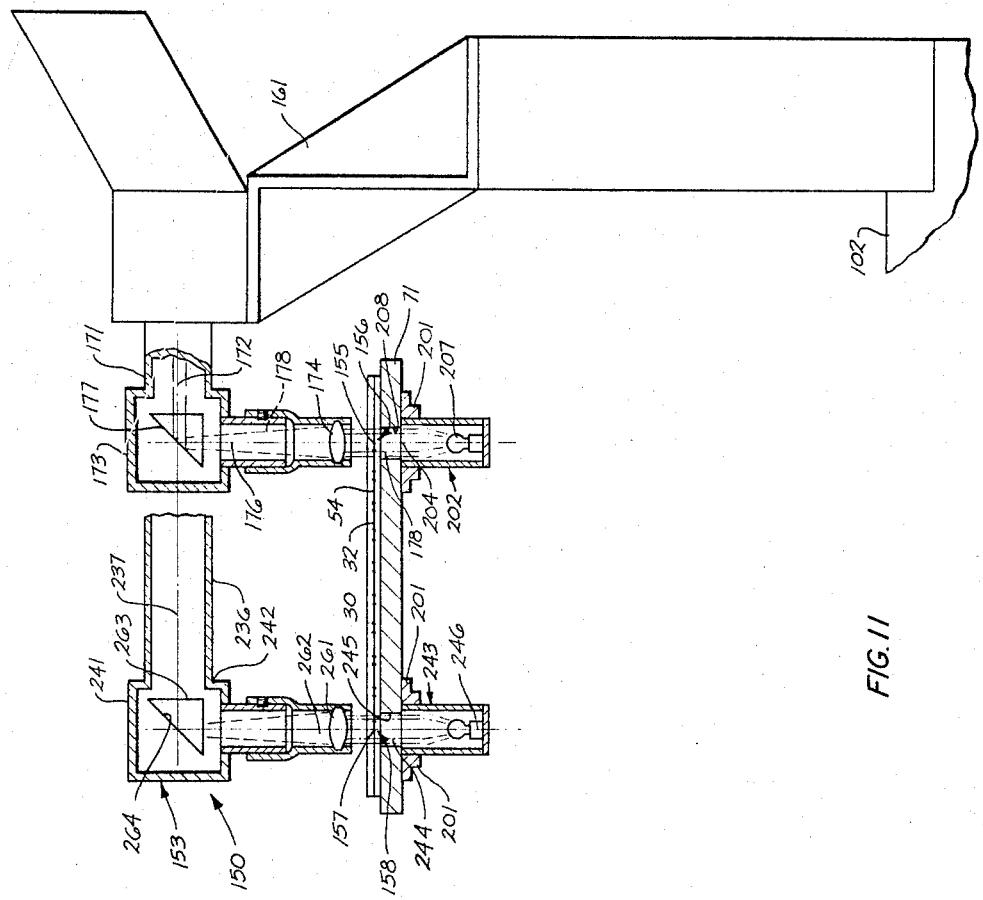
FIG. 11 is a cross-sectional view taken along line

Referring to FIGS. 10–12, there are shown first and second optical units 151 and 152, respectively, of the optical alignment system 150 which permit observation of the alignment of an outside return wire 155 of first outside pair 156 of the pairs 46—46 of twistor and return wires. Additionally, the first optical unit 151 and a third optical 153 (FIG. 10) unit of the optical alignment system 150 permit an operator to determine whether or not the first outside pair 156 and a second outside pair 158 of the pairs 46—46 of twistor and return wires deviate from the 4.400 inch center-to-center spacing which is the nominal or desired spacing between the centers of the two outside pairs 156 and 158.

Referring to FIGS. 7 and 10–12, a bracket 161 of the optical alignment system 150 is shown mounted to the main frame 102 independently from the scanner unit 72 and the table 71 to permit translational and rotary movement of the table 71, for example, independently from the bracket 161. In FIG. 10, first and second enclosures 162 and 163, respectively, are shown carried by the bracket 161 having a first reference 166 axis extending therethrough. A circular mirror 167 is mounted in the first enclosure 162 at a given angle 168 relative to the first reference axis 166 and to a partial mirror 170 that is mounted in the first enclosure 162 at a 45° angle with respect to the first reference axis 166.

A first tube 171 extends from the first enclosure 162 along a first horizontal axis 172 which is perpendicular to the first reference axis 166 and which intersects the center of the circular mirror 167. The first tube 171 supports a first prism housing 173 of the first optical unit 151.

The first prism housing 173 supports a first condensing lens 174 (FIG. 11) so that an optical axis 176 thereof is vertical and intersects the first horizontal axis 172. A first 45°–45°–90° prism 177 is mounted in the first prism housing 173 for reflecting a light beam 178 transmitted through the first condensing lens 174 through the first tube 171 and along the first horizontal axis 172 onto the circular mirror 167.

A 45°–45°–90° prism reflector 181 is mounted in the second enclosure 163 so that a surface 182 thereof is at an angle of 45° with respect to the first reference axis 166. The respective first and second enclosures 162 and 163 are interconnected by a main tube 184 which provides a field stop effect on a second light beam 186 reflected by the prism reflector 181 along the first reference axis 166. The main tube 184 has a larger diameter than that of the first tube 171 so that the second light beam 186 has a larger diameter than the first light beam 178.

As shown in FIGS. 10 and 12, a second tube 192 is shown extending from the second enclosure 163 along a second horizontal axis 193 positioned perpendicularly with respect to the first reference axis 166. The second tube 192 supports a second prism housing 194 of the second optical unit 152. A second condensing lens 196 is supported by the second prism housing 194 with an optical axis 197 thereof positioned vertically and intersecting the second horizontal axis 193. A second 45°–45°–90° prism 198 is mounted in the second prism housing 194 for reflecting the light beam 186 from the second condensing lens 196 through the second tube 192 for reflection by the prism reflector 181 along the first reference axis 166.

As shown in detail in FIGS. 11 and 12, angle brackets 201—201 are secured to the bottom of the table 71 for mounting first and second lamp units 202 and 203, respectively, beneath the twistor cable 30. An aperture 208 formed in the table 71 permits a first lamp 207 of the first lamp unit 202 to backlight the outside pair of wires 156 with the first light beam 178 which shines on the common plane 54. The first light beam 178 projected from the first lamp 207 is partially blocked by the outside pair of wires 156 so that a silhouette of the outside pair of wires 156 is formed in the first light beam 178. The first light beam 178 is transmitted through the ribbon 32 of the twistor cable 30 and through the first condensing lens 174 for reflection by the prism 177 along the first horizontal axis 172 onto the circular mirror 167 (FIG. 10). The first light beam 178 is reflected by the circular mirror 167 onto the partial mirror 170 which in turn reflects the first light beam 178 onto a ground glass screen 211 shown in FIG. 10 and in FIGS. 13–16. The first light beam 178 appears on the screen 211 as a first image 212 having a circular configuration. The image of the outside pair 156 of wires appears as a first shadow 214a on the screen 211 as shown in FIG. 13. The first shadow 214a includes shadows 214b and 214c formed by the wires of the first outside pair 156 of wires.

The second lamp unit 203 (FIG. 12) is provided with a second lamp 221 having an intensity less than that of the first lamp 207 for projecting the second light beam 186 through an aperture 222 in the table 71 to backlight the outside pair 156. A portion of the second light beam 186 is blocked by the outside pair 156 so that a second silhouette of the outside pair 156 is formed in the second light beam 186. The second light beam 186 passes through the ribbon 32 and is projected by the second condensing lens 196 onto the prism 198. The prism 198 reflects the second light beam 186 into the second enclosure 163 for reflection by the prism reflector 181 along the first reference axis 166 onto the partial mirror 170. The second light beam 186 is reflected by the partial mirror 170 onto the ground glass screen 211 to form an image 230 (FIG. 13) which is concentric with and surrounds the first image 212 in the form of an annulus. The second image 230 is less intense than the first image 212 because the intensity of the second lamp 221 is less than that of the first lamp 207. The image of the outside pair 156 appears on the screen 211 as a second shadow 231a and includes shadows 231b and 231c formed by the wires of the outside pair 156.

If the table 71 is correctly rotated, the respective first and second shadows 214a and 231a appearing on the ground glass screen will be horizontally aligned as shown in FIG. 14. However, if the table 71 is positioned so that the outside pair 156 of the twistor cable 30 is not perpendicular to the predetermined path 74 (FIG. 9) of advancement of the scanner unit 72, the respective first and second shadows 214a and 231a of the outside pair 156 will be vertically displaced as shown in FIG. 13. The rotation control knob 144 (FIG. 7) is rotated in a suitable direction to rotate the table 71 and position the first outside pair 156 perpendicular to the predetermined path 74 of travel. Also, with the table 71 correctly positioned transversely, the respective first and second shadows 214a and 231a formed by the two views of the outside pair 156 are positioned in horizontal alignment and centered with respect to a center line 271 as shown in FIG. 14.

If the respective first and second shadows 214a and 231a of the pair 156 are horizontally aligned but are displaced from the center line 271, the translational control knob 140 is rotated for moving the table 71. Selected movement of the table 71 will move the twistor cable 30 to align the outside pair 156 or twistor and return wires with the optical axes 176 and 197 so that respective first and third shadows 214a and 231a are centered on the center line 271 as shown in FIG. 14.

Referring now to FIG. 10, the respective first and third optical units 151 and 153 are shown separated transversely to determine if the outside pair 158 and the outside pair 156 are spaced by the nominal 4.400 inch center-to-center spacing. As shown in FIGS. 10 and 11, a third tube 236 is mounted on the first housing 162 and extends horizontally along a third horizontal axis 237 which is perpendicular to the first reference axis 166. The third tube 236 has a larger diameter than that of the main tube 184. A third prism housing 241 is mounted on a free end 242 of the third tube 236 for supporting the third optical unit 153. A pair of the angle brackets 201—201 mount a third lamp unit 243 under the table 71. The third lamp unit 243 is operated with the second lamp 221 extinguished to project a third light beam 244 upwardly through an aperture 245 in the table 71 onto the common plane 54 of the twistor cable 30 along a third optical axis 246 designed to be in vertical alignment with the outside pair 158 when it is properly spaced from the outside pair 156.

The third prism housing 241 supports a third condensing lens 261 with an optical axis 262 thereof perpendicular to the common plane 54. A 45°–45°–90° prism 263 is mounted in the third prism housing 241 so that a reflecting surface 264 thereof intersects the intersection of the optical axis 262 and the third horizontal axis 237. The outside pair 158 partially blocks the third light beam 244 so that a silhouette of the outside pair 158 is formed in the third light beam 244. The third light beam 244 is transmitted through the ribbon 32 of the twistor cable 30 and through the collecting lens 261. The third light beam 244 is reflected by the prism 263 along the third horizontal axis 237 and through the third tube 236 for transmission through the partial mirror 170 onto the screen 211 to form a third image 266 (FIG. 15). The third image 266 is larger than the first image 212 inasmuch as the diameter of the third tube 236 is greater than the effective diameter of the circular mirror 167 so that the third image 266 appears on the screen 211 in the form of an annulus which surrounds and is concentric with the first image 212. The intensity of the third light beam 244 is less than that of the first light beam 178 so that the third image 266 is darker than, and hence, contrasts with the first image 212. The image of the outside pair 158 is formed on the screen 211 as a third shadow 267a including shadows 271b and 271c formed by the individual wires of the pair 158.

Referring to FIG. 15, it may be understood that if the outside pair 158 and the outside pair 156 are positioned according to the nominal 4.400 inch spacing, the respective first and third shadows 214a and 267a of the respective pairs 156 and 158 will be aligned horizontally. However, as shown in FIG. 16, if the respective first and third pairs 156 and 158 are not properly spaced, the respective first and third shadows 214a and 267a will be vertically displaced.

It may be understood that if the width of the twistor and return wires is equal to the tolerance or acceptable deviation from the nominal spacing of the wires, the spacing of the wires will be within the tolerance if the shadows 214b and 267b, and the shadows 214c and 267c touch each other, such as indicated in FIG. 15. If such shadows do not touch each other (FIG. 16), the wires are not spaced within the tolerance and the scanner unit 72 need not be operated to test the twistor cable 30.

Referring to FIGS. 7 and 8, the scanner unit 72 is shown including the light source 76 and the light sensing head 78 which are supported by first and second arms 280 and 281, respectively, of a rigid, bifurcated frame 282. As shown in detail in FIGS. 8 and 17, the light source 76 includes a lower enclosure 283 supported by the first arm 280 beneath the light-transparent bed 113 so that a focal axis 284 of a focusing lens 285 is perpendicular to the common plane 54 of the respective twistor and return wires 34—34 and 42—42. As shown in FIGS. 17 and 18, a lamp 286 mounted in the lower enclosure 283 in alignment with the focal axis 284 is provided with a coil filament 288a having a longitudinal axis 289. The filament 288a is positioned so that the longitudinal axis 289 extends parallel to the longitudinal axis 124 of the table 71, and hence parallel to the longitudinal axis 36 of the wires.

As shown in detail in FIG. 17, the filament 288a is coiled and is so positioned to direct the brightest light emitted thereby along a line parallel to the longitudinal axis 36 of the twistor cable 30. The focusing lens 285 concentrates this light in the form of the light beam 77 having a bundle of rays focused onto a focal point 290 in the common plane 54 to form an image 288b (FIG. 18) of the filament. The return wire 34 shown in FIG. 17 positioned in the path of the light beam 77 acts as a barrier to approximately 70% of the light beam so that the silhouette 81 (FIG. 18) of the return wire 34 is formed in the light beam 77 and produces one of the shadows 83.

Referring again to FIGS. 7 and 8, the first arm 280 is shown extending into an opening 291 of the table support housing 104 for mounting a bracket 292 for vertical movement. The bracket 292 supports a pair of mutually perpendicular, upper and lower slides 293 and 294, respectively. The lower enclosure 283 is mounted to the upper slide 293 for vertical movement with the bracket 292 to permit the focal point 290 (FIG. 17) of the focused light beam 77 to be located in the common plane 54 of the respective twistor and return wires 34—34 and 42—42. The upper and lower slides 293 and 294, respectively, may be adjusted in two mutually perendicular directions relative to each other to position the focal point 290 (FIG. 17) in vertical alignment with the light sensing head 78.

The first arm 280 and the second arm 281 are integral parts of the rigid frame 282. The second arm 281 extends over the table 71 and the light-transparent bed 113 for supporting an upper enclosure 301 which contains the light sensing head 78. As shown in detail in FIG. 17, the light sensing head 78 includes a light-sensitive element 302, such as a PNPN phototransistor, sold under the trademark "Photran" by the Solid State Products Company, Inc., of Salem, Massachusetts. A lens system 303, such as a microscope, is mounted in the upper enclosure 301 for projecting the light beam 77 and the respective images 81 and 82 of the twistor and return wires through an eyepiece 304 onto a focusing lens 307 of the phototransistor 302.

The upper enclosure 301 maintains the microscope 303 in a fixed position with an optical axis 308 thereof positioned vertically. The respective upper and lower slides 293 and 294 are adjusted horizontally to vertically align the optical axis 284 of the lower lens 285 with the fixed opical axis 308 of the microscope 303.

Referring to FIGS. 7–9, the rigid, bifurcated frame 282 is fixed to a carriage 311 with the aligned, optical axes 284 and 308 positioned vertically. The carriage 311 may be fabricated from a rigid, hollow, casting provided with a top 312, a bottom 313, a first end 316 and an intermediate bracing member 317 extending across the top 312 and the bottom 313. The carriage 311 is mounted for movement parallel to the predetermined path 74 on ball bearings 318—318 (FIG. 7) which ride in two upper pairs 321 (FIGS. 7 and 9) and two lower pairs 322 (FIGS. 7 and 8) of opposed, V-shaped, precision ground ways. One way of each lower pair 322 is fixed to the bottom 313 and one way of each upper pair is fixed to the top 312 of the casing for cooperation with an opposed way secured to the carriage frame 103. The pairs 321 and 322 of ways are preloaded by means of set screws 323—323 (FIG. 7) to illuminate sideplay of the carriage 311 so that the carriage 311 is only free to move horizontally, parallel to the predetermined path 74.

The first end 316 of the casting is provided with an aperture 326 (FIG. 7) in which a precision, heavy duty, aluminum-bronze nut 327 (FIGS. 7 and 9) is fixedly received and keyed against rotation. A rigid, vertical plate 330 extends between side walls 331 and 332 of the carriage frame 103 into an opening 334 in the casting between the intermediate bracing member 317 and a second end 336 of the casting. The rigid plate 330 supports and positions against movement a horizontal, hollow cylinder 338 which receives a set of preloaded roller bearings 339 (FIG. 7). The roller bearings 339—339 mount one end 340 of a drive shaft or lead screw 341 for rotation while precluding axial movement thereof relative to the carriage frame 103. The lead screw 341 is fabricated with precision and may be a steel shaft which is precision ground to provide twenty-five threads per inch with an accuracy of 0.0002 inch over a length of approximately four and one half inches, for example. The lead screw 341 extends toward the first end 316 of the casting through an opening 342 in the bracing member 317 and is threaded in the nut 327. The lead screw 341 is mounted for rotation on a rear member 344 of the carriage frame 103. A motor 346 is provided on the main frame 103 for driving the lead screw 341 through a timing belt 347 and a timing pulley 348 keyed to the right end 349 of the lead screw 341.

With the precision, aluminum-bronze nut 327 fixedly received in the aperture 326 and keyed therein against rotation, and with the lead screw 341 mounted in the hollow cylinder 338 for rotation and against axial movement relative to the carriage frame 103, rotation of the lead screw 341 causes the nut 327 to advance the carriage 311 in the predetermined direction 74 at the predetermined speed.

Referring to FIG. 7, it may be understood that a portion 351 of the lead screw 341 extends to the right of the hollow cylinder 338 of the carriage frame 103. To this extending portion 351 of the lead screw 341 is mounted a bevel gear 352 of a set 353 of 1:2 ratio bevel and miter gears. As shown in FIGS. 7-9, a miter gear 354 of the set 353 is mounted for rotation on a shaft 356 having an axis 357 extending perpendicularly to the lead screw 341.

The shaft 356 is mounted for rotation in a housing 361 (FIGS. 8 and 9) secured to the side 332. The set 353 of bevel and miter gears is a precision set so that the rotation of the shaft 356 is accurately related and timed to the rotation of the lead screw 341. With such accurate timing, the helical anvil member 89, which is secured to and is rotated by the shaft 356, rotates in synchronism with the advancement of the carriage 311 along the pairs 321 and 322 of ways. More particularly, the shaft 356 rotates the helical anvil member 89 in accurately timed relationship to the advancement of the carriage 311 so that the portion 90 (FIG. 1) of the peripheral surface 91 of the helical anvil member 89 is vertically aligned with the datum line 93 of the strip 92 of pressure sensitive recording paper each time the carriage 311 advances the optical axis 308 of the light sensing head 78 into vertical alignment with the center 45 (FIG. 3) of a properly positioned twistor wire 42.

The carriage 311, and hence, the light sensing head 78 are advanced at a rate of 40 mils per revolution of the lead screw 341. The 1:2 ratio of the precision set 353 of miter and bevel gears causes the helical anvil member 89 to rotate once for each 20 mils of advancement of the light sensing head 78.

Considering a condition in which the silhouette 81 (FIG. 18) of a properly located twistor wire 42 is detected by the light sensing head 78, and in which the portion 90 of the peripheral surface 91 of the rotating helical anvil member 89 is aligned with the datum line 93, the signal 84 (FIG. 1) is generated to cause the printer bar 87 to squeeze the strip 92 of pressure sensitive recording paper against the aligned portion 90 to impress the mark 94 (FIG. 5) on the datum line 93. If the next twistor wire 42 sensed by the light sensing head 78 is 20 mils (or any multiple of 20 mils) from the first twistor wire 42, the helical anvil member 89 will have completed one full revolution (or any multiple thereof) and will have positioned the portion 90 of the peripheral surface 91 in vertical alignment with the datum line 93. At this time, another one of the signals 84 is generated by the light sensing head 78 and causes the printer bar 87 to advance upwardly and squeeze the strip 92 of pressure sensitive recording paper against the portion 90 of the helical anvil member 89 to impress another mark 94 which is superimposed on the datum line 93.

The printing mechanism 88, including the helical anvil member 89, the printer bar 87, and a drive 364 for advancing the strip 92 of pressure sensitive recording paper between the helical anvil member 89 and the printer bar 87 at a constant speed, may be standard items such as those supplied with a Model G-57, Watch-Rate recorder manufactured by the American Time Products Division of the Bulova Watch Company.

Referring in general to FIGS. 19, 20, and 21, the record control circuit (FIG. 19) is shown including relay contacts operated by relays connected as shown in a detached contact, motor control circuit (FIG. 20) which operates according to a predetermined sequence that is shown in a sequence chart (FIG. 21).

Referring now in detail to FIG. 19, the phototransistor 302 is shown connected to a signal forming circuit 381 of the record control circuit which is adapted to generate and supply the signals 84 for energizing a solenoid coil 382 of the recording unit 88. A source 383 of operating potential is connected to an anode 386 of the phototransistor 302 by a resistor 387 and a conductor 389. The phototransistor 302 is provided with a cathode 391 connected to ground 393 and a gate 394 connected to a gate 396 circuit which may be traced through a biasing resistor 397 and an ammeter 398 to ground 399. The phototransistor 302 is provided with a photosensitive, semiconductor junction 401 which is responsive to the focused light beam 77. The flow of current in the gate circuit 396 is dependent upon both the operating potential applied to the anode 386 and the intensity of the focused light beam 77 when it is directed onto semiconductor junction 401.

With a given operating potential applied to the anode 386 and with the focused light beam 77 having less than a given intensity when it is directed onto the junction 401 after passing through the ribbon 30, the resistance between the anode 386 and the cathode 391, i.e., the anode to cathode resistance, is high, $10^6$ ohms, for example, and the phototransistor 302 is in an off condition. However, when the focused light beam 77 has the given intensity when it is so directed onto the junction 401, triggering action of the phototransistor 302 occurs and the anode to cathode resistance drops to a low value, such as 10 ohms. The given intensity of the focused light beam 77 is sufficient to cause the gate current to attain a triggering value such as 15 microamperes, shown in FIGS. 22 and 23 as dashed lines 404 and 406, respectively. When the triggering action occurs, the gate current suddenly increases by approximately two microamperes, for example, to a value shown by the horizontal portions 408—408 and 409—409 of respective curves 411 and 412 shown in FIGS. 22 and 23.

When the phototransistor 302 conducts, the anode potential drops, whereas when the phototransistor 302 is turned off, the anode potential rises, and applies a positive going pulse 414 to the conductor 389.

Referring to FIG. 24, a graph 416 includes a series of curves 421, 423, 426, and 427 illustrating various intensities of the focused light beam 77 (when it is applied to the photosensitive junction 401) plotted as a function of the distance of the scanner unit 72 along the predetermined path 74. A line 417 of the graph 416 indicates the relative value of the given intensity of focused light which must be directed onto the photosensitive junction 401 to cause the triggering action to occur with the given operating potential applied to the anode 386.

Referring to the graph 416, the curve 421 indicates an initial intensity that is insufficient to cause the triggering action of the phototransistor 302, whereas the curve 423 indicates an initial intensity that is just sufficient to cause the triggering action to occur. It may be appreciated that any spurious fluctuation of intensity from the initial value shown by the curve 423 may cause the phototransistor 302 to turn off.

The curve 427 illustrates a condition in which the initial light intensity is sufficient to cause the triggering action to occur. The curve 427 also illustrates a decrease or dip in the intensity from a point 431 to a point 432 which results when the optical axis 308 (FIG. 17) of the scanner unit 72 approaches vertical alignment with the center 45 (FIG. 3) of the twistor wire 42. Between the point 432 and a point 433, the intensity increases as the scanner unit 72 advances along the predetermined path 74 and permits the twistor wire 42 to block less of the focused light beam 77. It may be appreciated that the slope of the curve 427 at points 434 and 436 of intersection thereof with the triggering line 417 is relatively low. The low slope renders it necessary to advance the scanner unit 72 a considerable length compared to the diameter of one of the twistor wires 42 before the intensity drops below the triggering line 417. Accordingly, the triggering action will not be very sensitive to the position of the twistor wire 42 when the focused light beam 77 has the initial intensity shown by the curve 427.

The curve 426 indicates at horizontal portions 438 and 439 thereof a preferred level of initial intensity of the focused light beam 77 when it is applied to the photosensitive junction 401 after passing through the ribbon 30. Between the horizontal portions 438 and 439, there is a dip 440 in the curve 426 caused by one of the shadows 83 (FIG. 17) as the optical axis 308 of the light sensitive head 78 approaches and passes vertical alignment with the center 45 (FIG. 3) of the twistor wire 42. Of critical significance is the slope of the dip 440 of the curve 426 at the points 441 and 442 of intersection thereof with the triggering line 417. It will be observed that the slope at these points 441 and 442 of intersection is very high, rendering the intensity in the range of the triggering line 417 very sensitive to changes in the position of the scanner unit 72. Also, the horizontal portions 438 and 439 of the curve 426 are sufficient above the triggering line 417 so that spurious variations of the initial intensity will not cause improper triggering action to occur. It may be noted that the width W of the dip 440 in the curve 426 between the intersections 441 and 442 is equal to approximately three times the diameter of a twistor wire 42.

Referring again to FIGS. 22 and 23, the gate currents resulting from various intensities of the focused light beam 77 projected onto the photosensitive junction 401 are related to the relative vertical alignment of the aligned optical axes 284 and 308 and the center 45 of one of the twistor wires 42. When the initial intensity shown by the curve 427 is used, it may be understood that when the scanner unit 72 advances and causes the respective aligned optical axes 308 and 284 of the microscope 303 and the light source 76 to pass into alignment with the center 45 of one of the twistor wires 42, the intensity of the focused light beam 77 is decreased from the initial value at the point 431 and causes the gate current to decrease according to the curve 411 (FIG. 22). Portions 452 and 453 of the curve 411 indicate a relatively low rate of change of the gate current with respect to changes in the position of the scanner unit 72 along the predetermined path 74. Such low rate of change occurs as the curve 441 crosses the triggering value line 404 indicating a relatively low sensitivity of the triggering action of the phototransistor 302 to the position of one of the twistor wires 42.

Referring to FIG. 23, the curve 412 indicates the gate current which results when the preferred intensity indicated by the curve 426 (FIG. 24) is utilized. The curve 412 (FIG. 23) indicates that the gate current remains at the constant 17 microampere value until the scanner unit 72 approaches vertical alignment with the center 45 of one of the twistor wires 42. As the intensity drops sharply according to the dip 440 of the curve 426 (FIG. 24), the gate current drops sharply along a dip or portion 462 of the curve 412. The portion 462 crosses the triggering value line 406 at a point 463 and the phototransistor 302 (FIG. 19) is turned off. Then, as the scanner unit 72 continues to advance, the slope of the dip 462 of the curve 412 reverses at point 461 and increases slowly along a portion 466 and increases sharply along a portion 468 until the curve 412 intersects the triggering value line 406 at a point 469. Because the slope of the portion 468 is sharp, the exact time at which the phototransistor 302 is again turned on as the aligned optical axes 284 and 308 move out of alignment with the center 45 of one of the twistor wires 42 is very sensitive to the position of the center 45 of the twistor wire 42.

Referring now to FIG. 19, a variable power supply 471 is shown for energizing the lamp 286 to permit adjustment of the intensity of the focused light beam 77. For simplicity of explanation, the variable power supply 471 is shown as a series connected potentiometer 472 and a battery 473, although electronic controls may be provided for precise adjustment of the current through the lamp 286. To adjust the sensitivity of the phototransistor 302 according to the curve 412 shown in FIG. 23, the lamp 286 is energized and the scanner unit 72 is moved along the predetermined path 74 relative to the twistor cable 30 so that the focused light beam 77 is in an off-wire position, i.e., is not focused on a twistor wire 42. This permits the focused light beam 77 to pass through the ribbon 30 and through the microscope 301 to the phototransistor 302 without interruption by any of the twistor or return wires. The potentiometer 472 is adjusted to reduce the current flow through the lamp 286 and dim the intensity of the focused light beam 77 so that the phototransistor 302 is in the off condition, whereafter the potentiometer 472 is carefully adjusted to slowly increase current through the lamp 286, and hence, the intensity of the focused light beam 77. As the lamp current increases, the gate current of the phototransistor 302 increases as indicated by the ammeter 398 in the gate circuit 396. The lamp current is increased until the triggering action occurs and the gate current suddenly increases by approximately 2 microamperes. The potentiometer 472 is then adjusted to increase the voltage across the lamp 286 by about 0.5 volt, for example, to increase the intensity of the focused light beam 77 to the level indicated by the horizontal portions 438 and 439 of the curve 426 (FIG. 24), while the gate current remains at the 17 microampere value as indicated by the horizontal portions 409—409 of the curve 461 (FIG. 23).

The significance of focusing the focused light beam 77 on the common plane 54 may be appreciated by referring to FIG. 3, where there is shown a beam 470 of light having pairs 474 and 475 of parallel rays directed toward the cable 30 in the general direction of one of the return wires 34. The pairs 474 and 475 of rays are not aligned with and hence pass the return wire 34 and are transmitted directly through the cable 30. However, a ray 476 directed toward the center 45 of the return wire 34 is reflected by the return wire back through the layer 49 and hence is completely blocked. If all rays, such as the ray 476, which are directed toward the return wire 34, were completely blocked, a shadow 477a having a width 477b equal to the diameter of the return wire 34, would be formed in the light beam 470. However, the light beam 470 includes other rays, such as a ray 479 directed toward the return wire 34 between the pairs 474 and 475 of rays. The ray 479 is reflected toward the layer 49, but is rereflected at an interface 478 between the layers 49 and 52 onto the adjacent twistor wire 42. The adjacent twistor wire 42 reflects the ray 479 back onto the return wire 34 so that the ray 479 is reflected into the area of the shadow 477a. The ray 479 reduces the width 477b of the shadow 477a to a value less than the diameter of the return wire 34. It may be understood that with the shadow 476 incorrectly representing the width of the return wire 34, the phototransistor would generate the pulses 414 and 498 at times which are not properly related to the spacing of the wires 34—34 and 42—42.

This problem is avoided by focusing the light beam 77 onto the common plane 54 of the cable 30 so that the pulses 414 and 498 will be generated at times which are properly related to the spacing of the wires 34—34 and 42—42. This is illustrated in FIG. 17, in which the bundle of rays emitted by the filament 288a of the lamp 286 are not parallel, but are focused and converge to form the image 288b (FIG. 18) in the common plane 54.

Referring again to FIG. 19, it will be recalled that the anode 386 is connected to the conductor 389. The conductor 389 is connected to the resistor 387 and to a pulse forming capacitor 481. The pulse forming capacitor 481 is connected to a resistor 482, to a base 483 of a transistor 486, and to ground 492 through a resistor 491. When the phototransistor 302 is off, the pulse forming capacitor 481 is charged through a circuit which may be traced from the source 383 of operating potential, through the resistor 387, through the pulse forming capacitor 481, and through the resistor 491 to the ground 492. When charged, the pulse forming capacitor 481 is in condition for operation.

Such operation of the pulse forming capacitor occurs when the gate current increases according to the portion 468 of the curve 461 and exceeds the triggering value indicated by the triggering value line 406 in FIG. 23. At this time the phototransistor 302 conducts and permits the pulse forming capacitor 481 to discharge through a circuit including the resistor 491, the pulse forming capacitor 481, the anode 386, the cathode 391, a conductor 494, and the ground 393. When the pulse forming capacitor 481 discharges, a negative going input pulse 496 is applied to the base 483 of the transistor 486.

The phototransistor 302 is turned off as the scanner unit 72 approaches the next successive twistor wire 42 and causes such wire 42 to interrupt the focused light beam. Such interruption is effective to cause the anode potential to rise so that a successive, positive going pulse 498 appears at the anode 386 to initiate the charging of the pulse forming capacitor 481.

Relating this operation of the pulse forming capacitor 481 to the advancement of the scanner unit 72 along the predetermined path 74 relative to the respective return and twistor wires 34 and 42, it may be understood that with the scanner unit 72 advancing in an off wire position, the photosensitive semiconductor junction 401 of the phototransistor 302 is illuminated by the full initial intensity (portion 438, FIG. 24) of the focused light beam 77, which intensity renders the phototransistor 302 conductive. Considering a condition after the phototransistor 302 has conducted and after the pulse forming capacitor 481 has discharged, the output pulse 496 and the transient decay thereof will be complete so that the base 483 of the transistor 486 is biased to render the transistor 486 in a normal, conductive condition. As the scanner unit 72 continues to move along the predetermined path 74, the aligned optical axes 284 and 308 approach vertical alignment with the center 45 of the twistor wire 42 so that the twistor wire 42 begins to interrupt the focused light beam 77 and causes the gate current to decrease suddenly. As shown by the dip in the curve 461 shown in FIG. 23, the gate current decreases as a function of the position of the aligned optical axes 284 and 308 with respect to the center 45 of the twistor wire 42 and in particular, decreases sharply below the triggering value line 406 as the optical axes 284 and 308 approach the center 45 of the twistor wire 42. The gate current then rises sharply to the point 469 of curve 461 (FIG. 23) and exceeds the triggering value to effect the triggering action.

When the triggering action of the phototransistor 302 occurs, the capacitor 481 discharges and produces the sharp negative going input pulse 496 which is applied to the base 483 of the transistor 486. The negative going pulse 496 cuts off the normally conductive operation thereof of the transistor 486 and causes the potential at a collector 501 thereof to rise sharply to produce a first, positive going input pulse 504 having a peak value of 18 volts, for example.

Since the distance between the respective return and twistor wires 34 and 42 of one of the pairs 44—44 of twistor and return wires is normally 20 mils, and because the scanning unit 72 travels at a rate of 200 mils per second, a second negative going pulse 497 is generated for causing the transistor 486 to generate a second positive going input pulse 506 similar to the first pulse 504. The input pulse 506 is generated by the transistor 486, 100 milliseconds after the generation of the first pulse 504. Similarly, because there is normally an 80 mil distance from the twistor wire 42 of one pair 44 to the return wire 34 of a next subsequent pair 44, a third positive going input pulse 507 is initiated 400 milliseconds after the initiation of the second pulse 506. This pattern of pulse generation is repeated during the scanning of all of the wires of the twistor cable 30 and results in the production of a train 509 of pulses.

The train 509 of pulses from the transistor 486 is applied to a pulse separation and counting circuit 511 which is adapted to count all the twistor and return wires sensed by the light sensing head 78 and also to cause the generation of the signal 84 which energizes the solenoid coil 382 upon sensing every twistor wire 42, for example.

The separation and counting circuit 511 includes a coupling capacitor 512 connected to a gate 513 of a PNPN silicon controlled switch 514. Between the applications of the first, second, etc. input pulses 504, 506, 507, etc. onto the gate 513 of the switch 514, the switch is in an off or nonconductive condition and permits a capacitor 516 to charge in response to a potential applied from a source 517 of potential through a series circuit 518 which may be traced through a resistor 519, the capacitor 516, and a resistor 521 to ground 522.

Application of one pulse of the series 509 of positive going input pulses to the gate 513 of the switch 514 abruptly renders the switch 514 conductive to condition a discharge circuit 523 which may be traced from the resistor 521, through the capacitor 516, through the now-conductive switch 514 and through a normally open contact 526 to ground 527. The contact 526 is normally closed when the scanner unit 72 is advancing relative to the twistor cable 30 intermediate the front and rear limits of its travel. Accordingly, the capacitor discharges through the circuit 523 and a negative going pulse, such as a negative going 75-volt pulse 531, is developed across the resistor 521. Similarly, the second positive going input pulse 506 causes the switch 514 and the capacitor 516 to generate a second negative going pulse 532 to produce a train 533 of negative going pulses in response to the train 509 of pulses.

The 75-volt pulse 531 is applied by a conductor 534 to a stepping cathode 536 of a counting tube 538, such as a standard 439A-type counting tube sold by the American Telephone and Telegraph Company. The counting tube 538 includes an anode 539 connected to a source 541 of operating potential, and a series of interconnected stepping cathodes shown in FIG. 19 as the one stepping cathode 536 for simplicity. The counting tube 538 also includes a series of stepping and output cathodes arranged alternately to provide a stepping cathode, an odd cathode, a stepping cathode, an even cathode, a stepping cathode, etc. The odd cathodes are interconnected and are represented in FIG. 19 by an odd cathode designated 544. Similarly, the even cathodes are interconnected and are represented in FIG. 19 by an even cathode designated 546.

In a reset or starting position of the counting tube 538, an arc 549 extends between the anode 539 and a normal or reset cathode 551. In response to one pulse of the negative going portion of one pulse 531 of the series 533 of negative going 75-volt pulses, the arc 549 is transferred to the first odd stepping cathode 544. As the first negative going 75-volt pulse 531 rises, the arc 549 is transferred to the first odd cathode 544 to indicate and record the sensing of the first, for example, return wire 155 (FIG. 11). A negative going portion of a second negative going 75-volt pulse 532 applied to the stepping cathode 536 causes transfer of the arc 549 from the first odd cathode 544 to the stepping cathode 536 intermediate to the first odd cathode 544 and the first even cathode 546. As the second negative going 75-volt pulse 532 rises, the arc 549 is transferred to the first even cathode 546 to indicate and record the sensing of the second wire, which is the twistor wire 42 of the pair of wires 156 (FIG. 11). This operation is continued until ten wires have been counted, at which time the tenth negative going 75-volt pulse of the series 533 of pulses transfers the arc 549 to the stepping anode 554 of a second or tens digit counting tube 556 of the 439A type, for example.

At this time the first counting tube 538, will indicate a numeral 0, while the second counting tube 556 will indicate a numeral 1. By placing the counting tube 556 to the left of the counting tube 538, the numerals may be read by an observer as a 1 followed by 0, indicating 10 pulses of the series 533 had occurred and hence, 10 wires had been scanned.

In the manner described for the first counting tube 538, the tens counting tube 556 registers every tenth pulse of the series 533 of pulses. Because the twistor cable 30 has a total of 90 wires, the tens counting tube 556 will register 9 at the end of one complete scanning operation, while the units counting tube 536 will register 0 to indicate the total 90.

At the start of each scanning operation and before the scanner unit 72 approaches the wires, a reset circuit 561 is completed to reset the respective units and tens counting tubes 538 and 556. The reset circuit 561 includes a conductor 562 connected to the reset cathode 551 of the units counting tube 538 and a conductor 566 connected to a reset cathode 568 of the tens counting tube 556. The conductor 562 is connected to the conductor 566 and to ground 574 through a capacitor 571 and a reset control contact 576. The capacitor 571 is connected to a source 572 of biasing potential through a resistor 573. The reset control contact 576 is normally open to permit the capacitor 571 to charge through the resistor 573 and a resistor 577. At the start of a scanning operation, the reset control contact 576 is closed to permit the capacitor 571 to discharge and apply a negative going 200-volt pulse to both of the respective reset cathodes 551 and 568 which reset the respective units and tens counting tubes 538 and 556.

The odd output cathodes 544 are connected to ground 581 through a first cathode resistor 582, whereas the even output cathodes 546 are connected to ground 583 through a second cathode resistor 584. As the arc 549 is transferred to each even output cathode 546, a positive going potential 586 is applied to the resistor 584. When the arc 549 moves to the stepping cathode 536 upon sensing of the next-subsequent wire, the potential 586 applied to the resistor 584 falls to ground potential. A conductor 588 connected between the even output cathode 546 and the resistor 584 passes the rise and fall of the potential 586 applied to the resistor 584 through an even contact 591 of a switch 592 to a capacitor 593, which differentiates the rising and falling portions of the potential 586 producing positive and negative going pulses 587 and 589. Similarly, the resistor 582 has rising and falling potentials (not shown) applied thereto as the arc 549 is transferred to and removed from the odd output cathodes 544. A conductor 596 passes such changing potential to the capacitor 593 if the switch 592 is positioned to an even contact 597.

It may be understood that according to the position of the switch 592, rising and falling potentials, for example, from the second cathode resistor 584 are selectively passed to the capacitor 593 so that the spacing of only the twistor wires 42, for example, is indicated by the timing of the positive pulses 586, for example, passed from the second cathode resistor 584. With the switch 592 positioned on the even contact 591, for example, the rising and falling portions of the potential 586 from the second cathode resistor 584 are applied to the capacitor 593 and to a diode network 601 including a parallel combination of diodes 602 and 603 connected in series with the capacitor 593. The negative going pulses 589 are passed to ground 604 through the diode 603 whereas positive going pulses 587 are passed by the diode 602 to a resistor 606 connected in series therewith and through an even armature 607 of a switch 608 to a conventional, four stage, resistance-coupled amplifier 611 which sharpens each of the pulses 586 and eliminates low frequency components thereof.

The amplifier 611 applies each of the sharpened pulses 586 to a circuit 612 for generating the signals 84. The circuit 612 includes a coupling capacitor 615, a resistor 616, and a grid 617 of a thyratron 619. An anode 621 of the thyratron 619 is connected to a standard source 622 of operating potential through a resistor 623. The anode 621 is also connected to a capacitor 625 which, when the thyratron 619 is in an off or nonconductive condition, is charged from the source 622 and through a circuit 628 which may be traced through a resistor 623, through the solenoid coil 382, through a resistor 624, and through a contact 626 to ground 627 to condition the printer bar 87 for operation. The contact 626 is normally closed when the scanner unit 72 is advancing rearwardly during a scanning operation to permit the capacitor 625 to charge.

In response to the positive going pulse 586 applied to the grid 617, the thyratron 619 conducts to permit the charged capacitor 625 to discharge through the solenoid coil 382 and through the thyratron 619. Because of the inductive-capacitive combination of the coil 382 and the capacitor 625, the discharge current of the capacitor 625 is oscillatory and, upon reversal, tends to drive electrons from the anode 621 toward a cathode 631 of the thyratron 619. This action effectively opens the anode circuit and cuts off the thyratron 619 so that the source 622 recharges the capacitor 625.

Energization of the solenoid coil 382 causes the printer bar 87 to advance upwardly toward the portion 90 of the peripheral surface 91 to urge the strip 92 (FIG. 1) of pressure sensitive recording paper against the helical anvil member 89, causing one of the marks 94 or 96 (FIGS. 5 and 6) to appear on the strip 92 of pressure sensitive recording paper.

Referring now to FIGS. 20 and 21 which show the respective detached contact motor control circuit and the sequence diagram, there is shown in FIG. 20 a main power supply 640 connected to main conductors 641 and 642. The operation of the apparatus is initiated by an operator pressing a start button 644 to close a contact 645 of a start switch 646 to complete a circuit 647 which may be traced from the first main conductor 641 through the now-closed contact 645 and through a start and pulse relay 648 to the second main conductor 642. Energization of the start and pulse relay 648 draws up the normally open contact 576 (shown also in FIG. 19) of a circuit 649 for resetting the counting tubes 538 and 556. Additionally, the relay 648 draws up a normally open contact 650 in a circuit 651.

Referring to a circuit 653 (FIG. 20), it will be assumed that the carriage 311 is initially located in the front position so that the scanner unit 72 is near an operator who may be standing to the right of the apparatus as shown in FIG. 7. As shown in the circuit 653, the carriage 311 in the front position actuates a front limit switch 654 (FIG. 20) to close a normally open contact 655 to complete the circuit 653 and energize a front auxiliary relay 656. Upon energization, the front auxiliary relay 656 opens a normally-closed contact 657 connected in a circuit 658, and draws up a normally closed contact 659 to complete the circuit 651 from the first main conductor 641 through the now-closed contact 650, through the now-closed contact 659 and through a reverse latch-relay 661 to the second main conductor 642.

Upon energization, the reverse-latch relay 661 draws up a contact 662 in a circuit 663 to complete the circuit 663 from the first main conductor 641 through the now-closed contact 662 through an arm 664 of a switch 666 positioned on a reverse contact 667, and through a paper-feed motor 668 of the drive 364 (FIG. 1) to the second main conductor 642. Additionally, a direction print relay 671 is connected in a circuit 672 in parallel with the paper-feed motor 668 for energization upon closure of the contact 662.

Energization of the direction print relay 671 draws up a normally open contact 669 connected in a counting conditioning circuit 670. Energization of the direction print relay 671 also draws up a normally open contact 673 connected in the circuit 658. The circuit 658 may be traced from a power source 677, through a relay 678, through the now-open contact 657, through a normally closed contact 679 and through the now-closed contact 673 to ground 681.

Energization of the reverse-latch relay 661 also draws up a contact 683 to complete a circuit 684 from the main conductor 641 through the now-closed contact 683 and through a motor-reverse relay 686 to the second main conductor 642 and to energize a lamp. Upon energization, the motor-reverse relay 686 draws up motor-reverse contacts 687 and 688 of a circuit 689 for conditioning a coil 692 of the motor 346 (FIG. 7) for reverse rotation. Also, upon energization, the motor-reverse relay 686 draws up a normally open contact 693 to complete the circuit 694 through a coil 691 and a coil 692 to energize the motor 346 and initiate advancement of the carriage 311 (FIG. 7) to the rear of the apparatus, i.e., to the left as shown in FIG. 7.

As the carriage advances toward the rear, the front limit switch 654 opens to open the contact 655 and to permit closure of a normally closed contact 701. Opening of the contact 655 de-energizes the circuit 653 so that the front auxiliary relay 656 is deenergized. Upon deenergization, the front auxiliary relay 656 releases the normally closed contact 657 to complete the circuit 658 and energize the relay 678. Upon energization, the relay 678 draws up the normally open contact 626 (FIG. 19) to complete the charging circuit of the capacitor 625 and permit the capacitor 625 to charge. The relay 678 also draws up a normally open contact 706 of a circuit 707 to energize a print indicating lamp 708.

As shown in FIG. 20, closure of the front limit switch contact 701 completes the circuit 670 through the now-closed contact 669, through a relay 711 and then a normally closed contact 731 of a rear limit switch 730, to the main conductor 641. Energization of the relay 711 draws up the normally open contact 526 shown in FIG. 19 connected between the switch 514 and ground 527, to condition the switch 514 for operation.

Also upon deenergization of the front auxiliary relay 656, a normally open contact 714 is permitted to open a circuit 716 which de-energizes an unlatch-forward relay 717. The relay 717 precludes latching of the contacts of a forward-latch relay 719 connected in a circuit 721.

At this time in the operational cycle, the apparatus is conditioned for sensing the twistor wires 42—42. Referring now to FIG. 19, carriage 311 advances the light sensing head 78 and the light source 76 to the rear of the apparatus (to the left as shown in FIG. 19) so that the light projected by the filament 288a (FIG. 17) is focused by the lens 285 onto the common plane 54 of the twistor wires 42—42. As the scanner unit 72 (FIG. 1) continues to advance to the rear, the focused light beam 77 (FIG. 19) is transmitted through the ribbon 32 (FIG. 3) of the twistor cable 30. With the intensity of the light beam projected by the filament 288a adjusted to produce the preferred intensity 438 (FIG. 24), the intensity of the focused light beam 77 (FIG. 19) when it is applied to the photosensitive junction 401 is sufficient to cause the phototransistor 302 to conduct. As the scanner unit 72 continues to advance to the rear, the filament 288a approaches the first return wire 155 of the pair 156 (FIG. 11) of outside wires. The return wire 155 interrupts the focused light beam 77 (FIG. 19) and causes a decrease (as shown in the curve 426 in FIG. 24) in the intensity thereof as it is transmitted through the ribbon 32 (FIG. 3). When the intensity of the focused light beam 77 transmitted through the ribbon 32 decreases to the point 441 (FIG. 24) of the curve 426, the gate current indicated by the curve 412 (FIG. 23) decreases below the triggering value line 406 so that the phototransistor 302 is turned off. In the off condition of the phototransistor 302 (FIG. 19), the positive going pulse 414 appears at the anode 386 and is applied to the capacitor 481 to initiate charging thereof. As the light sensing head 78 continues rearwardly out of alignment with the center 45 of the return wire 155 (FIG. 11), the intensity of illumination of the focused light beam 77 transmitted through the ribbon 32 increases and causes an increase in the gate current shown by the portions 466 and 468 of the curve 412 (FIG. 23). As the light sensing head 78 advances completely out of alignment with the return wire 155 and into the off wire condition, the phototransistor 302 conducts and permits the capacitor 481 to discharge so that the negative going pulse 496 is applied to the base 483 of the transistor 486. The negative going pulse 496 cuts off the transistor 486 so that the potential on the collector 501 rises and applies the 18 volt, positive going pulse 504 to the capacitor 512.

As the scanner unit 72 continues to advance to the rear, the series 509 of respective first, second, third, etc. positive going input pulses 504, 506, and 507, etc. is generated as the successive twistor wires 42—42 and return wires 34—34 intercept the focused light beam. The series 509 of positive going input pulses 504, 506, 507, etc. is applied to the coupling capacitor 512 of the pulse separation and counting circuit 511 for causing generation of the successive positive pulses 586 which are indicative of the relative spacing of the twistor wires 42—42. The successive positive pulses 586 render the capacitor 625 effective to generate the signals 84 which render the printer bar 87 effective to successively cause the marks 95 or 96 (FIGS. 5 and 6) to be formed on the strip 92 of paper according to the relative spacing of the twistor wires 42—42.

Referring again to FIG. 20, when the scanner unit 72 has scanned all the pairs 44—44 of wires, the carriage 311 actuates a rear limit switch 730 to open the normally closed contact 731 in the circuit 670. Upon opening of the contact 731, the circuit 670 through the relay 711 is opened to deenergize the relay 711. Upon deenergization, the relay 711 permits the normally open contact 526 (FIG. 19) in the circuit 523 of the switch 514 to open to prevent additional signals 531 from being applied to the counting tube 538 (FIG. 19).

Additionally, actuation of the rear limit switch 730 draws up a normally open contact 734 for completing a circuit 736 to energize a rear auxiliary relay 737. Upon energization, the rear auxiliary relay 737 opens the contact 679 in circuit 658 to deenergize the relay 678. Upon deenergization, the relay 678 permits the normally open contact 626 (FIG. 19) in the circuit 628 to open for precluding charging of the capacitor 625.

Additionally, upon energization of the rear auxiliary relay 737, a normally open contact 741 is closed to energize an unlatch reverse relay 742 connected in a circuit 743. Upon energization, the unlatch reverse relay 742 unlatches the reverse-latch relay 661. Upon unlatching, the reverse-latch relay 661 permits the normally open contact 662 in the circuit 663 to open to interrupt the operation of the paper-feed motor 668 and to deenergize the direction print relay 671. Upon deenergization, the direction print relay 671 releases the normally open contact 673 in the circuit 658 to prevent recording of any pulses during the forward travel of the carriage 311. Additionally, upon deenergization of the direction print relay 671, the normally open contact 669 in the circuit 670 is released and opens to preclude energization of the relay 711 and hence, to preclude operation of the counting tubes 538 and 556 during the forward travel of the carriage 311.

Additionally, upon unlatching of the reverse-latch relay 661, the normally open contact 683 in the circuit 684 is opened to deenergize the motor-reverse relay 686. Deenergization of the motor-reverse relay 686 permits opening of the normally open contacts 687 and 688 which deenergize the reversible coil 692, and permits the normally open contact 693 in the circuit 694 to open to deenergize the coil 691 so that the motor 346 stops.

Upon energization, the rear auxiliary relay 737 also draws up a normally open contact 738 to complete the circuit 721 and energize the forward latch relay 719.

Upon energization, the forward-latch relay 719 draws up a contact 751 to complete a circuit 753 to energize a lamp 750 and to complete a circuit 752 to energize a motor-forward relay 754. The motor-forward relay 754 draws up normally open contacts 756 and 757 to condition the reversible coil 692 of the lead-screw motor 346 for operation in the forward direction. Additionally, the motor-forward relay 754 draws up a normally closed contact 761 in the circuit 694 to energize the coils 691 and 692 to energize lead-screw motor 346 which initiates advancement of the carriage 311 in the forward direction.

The carriage advances in the forward direction until the carriage 311 closes the front limit switch 654 in circuits 653 and 670. Upon actuation, the front limit switch 654 closes the circuit 653 to energize the front auxiliary relay 656. Upon energization, the front auxiliary relay 656 closes the normally open contact 714 in the circuit 716 to energize the forward-unlatch relay 717. Upon energization, the forward-unlatch relay 717 unlatches the forward-latch relay 719. Upon unlatching, the forward-latch relay 719 permits the normally closed contact 751 to open the circuit 752 through the motor-forward relay 754 and the forward lamp 750 to permit opening of the normally open contacts 756, 757, and 761 to deenergize the lead-screw motor 346. At this time, the apparatus is conditioned for initiation of the next successive monitoring cycle upon advancement of the next successive section of the twistor cable 30 onto the table 71 (FIG. 7).

During the forward advancement of the carriage 311, the operator observes the respective first and second counting tubes 538 and 556 to determine if the scanner unit 72 (FIG. 1) has scanned a total of 90 twistor and return wires 34 and 42 during the monitoring operation. Additionally, during the forward advancement of the carriage 311, the operator may visibly examine the strip 92 of pressure-sensitive recording paper to determine whether or not the respective twistor and return wires 34—34 and 42—42 are properly spaced. The operator has sufficient time to determine the spacing of the wires during the forward travel of the carriage 311, after which time the clamped section of the twistor cable 30 which has just been monitored is unclamped and another section to be monitored is advanced onto the table 71 and clamped into position.

The operator then utilizes the optical alignment system 150 (FIG. 10) to align the twistor cable 30 with the predetermined path 74 of travel to the scanner unit 72 and to determine the conformity of the spacing of the outside pairs 156 and 158 to the nominal 4.400 inch distance. If the outside pairs 156 and 158 are spaced beyond the tolerance limits, the monitoring operation need not be performed. However, if the optical alignment system 150 indicates spacing of the outside pairs within the tolerance limits, the operator may initiate the automatic monitoring operation by actuating the start button 644 (FIG. 20). As described above, the scanner unit 72 then automatically scans the twistor cable 30 and returns to the front position.

Referring now to FIG. 25, there is shown an embodiment 801 constructed according to the principles of the present invention. The embodiment 801 includes first and second scanner units 802 and 872, respectively, moved by a carriage 811 relative to a standard 814 and the twistor cable 30, respectively. The scanner unit 872 causes marks 895 to be applied to a strip 892 of pressure sensitive recording paper for indicating the relative spacing of respective return and twistor wires 834 and 842 and the scanner unit 802 causes marks 898 to be applied to the strip 892 for indicating, during a single scanning operation, if the spacing of the wires is acceptable.

More particularly, the standard 814 includes a light-transparent, rectangular plate 815 provided with opaque members or markings 816—816 thereon at predetermined locations relative to a pair of longitudinal and transverse axes 817 and 818, respectively, of the plate. A light beam 897 from the first scanner unit 802 scans the plate 815 along a predetermined path 874 parallel to the transverse axis 818 and is modified or interrupted by the opaque members 816—816 to produce a series of shadows, for example in the light beam.

The standard 814 is mounted on a flat, light-transparent table 871 which is similar to the table 71, but includes an auxiliary portion 873 for supporting the standard 814 with the transverse axis 818 parallel to the predetermined path 874. The table 871 also mounts the twistor cable 30 with the transverse axis 38 thereof parallel to the predetermined path 74 of the second scanner unit 872.

The carriage 811 is similar to the carriage 311 and supports left and right, bifurcated frames 882a and 882b respectively, which support the respective second and first scanner units 872 and 802. The second scanner unit 872 is identical to and operates in the same manner as the scanner unit 72. The second scanner unit 872 includes a source of radiation, such as a light source 876 which is mounted to the frame 882a on one side of the twistor cable 30. The light source 876 projects a focused beam 877 of light on the common plane 54 (FIG. 3). Mounted on the other side of the twistor cable 30 and in vertical alignment with the light source 876, the second scanner unit 872 is shown including a light sensing head 878 that is responsive to the beam 877 of light.

The right frame 882b supports the first scanner unit 802. The first scanner unit 802 includes a source 978 of radiation, such as a light source, which is mounted by the frame 882b on one side of the standard 814 for projecting the focused beam 897 of light onto the opaque members 816. Mounted on the other side of the standard 814 and in vertical alignment with the light source 976, is a light sensing head 976 that is responsive to the focused light beam 897.

A precision drive mechanism 879, identical to the precision drive mechanism 79, drives the carriage 811 which moves both of the first and second scanner units 802 and 872 relative to the table 871 along the predetermined paths 874 and 74 at a given rate of advancement. The relative movement advances the light source 876 and the light sensing head 878 relative to the twistor cable 30 so that the return and twistor wires 34—34 and 42—42, respectively, interrupt the light beam 877 at a rate indicative of the relative spacing of the return and twistor wires. The relative movement also advances the light source 978 and the light sensing head 976 relative to the standard 814 so that the opaque members 816 interrupt the light beam 897 at a rate which is indicative of a desired spacing of the wires of the twistor cable 30.

The interruption of the light beam 877 causes the light sensing head 878 to generate signals 884, whereas the interruption of the light beam 897 causes the light sensing head 976 to generate signals 984, in a manner similar to the operation of the light sensing head 78. A record control circuit 886 is responsive to the signals 884 and 984 in a manner similar to the response of the circuit 86 to the signals 84 for operating a printer bar 887 of a recording unit 888.

The precision drive mechanism 879 also rotates a helical anvil member 889 of the recording unit 888 at a selected rate which is proportional to the given rate of advancement of the scanner units 802 and 872 along the predetermined paths 874 and 74 across the respective standard 814 and the twistor cable 30. The helical anvil member 889 is identical to the helical anvil in 89 and hence, cooperates with the printer bar 887 to produce the marks 895 on the strip 892 of pressure sensitive paper in the same manner as the printer bar 82 cooperates with the helical anvil member 89 to produce the marks 94. In particular, certain marks 894 of the marks 895 will be produced on the strip 892 in a straight line if the wires of the twistor cable 30 are nominally spaced, i.e., spaced exactly as desired. If the wires of the cable 30 are not nominally spaced, marks 896—896 of the marks 895 will be produced on the strip 892 displaced from the marks 894 by various amounts indicative of the deviation of the spacing of the wires from the nominal spacing.

The opaque members 816 are provided on the standard at the predetermined locations to cause the light sensing head 976 to generate three of the signals 984 between the times that the light sensing head 878 generates two of the signals 884. Thus, the signals applied to the record control circuit 886 are in a series as follows: two signals 884 (indicative of the spacing of the return and twistor wires 34 and 42), followed by three signals 984 (indicative of a range of limits for the signals 884), etc. The opaque members 816 are spaced so that successive ones of the signals 984 will cause marks 985, 986, and 987 to be produced on the strip 892 to define outer limits for the marks 895. Thus, if the marks 896—896 are produced on the strip 892 between longitudinal lines defined by the marks 985, 986, and 987, the marks 896—896 indicate that the wires of the cable 30 are spaced within an acceptable tolerance.

By providing the standard 814 and the first scanner unit 802 in conjunction with the second scanner unit 872, the location of the outer limits of the wires of the cable 30 can be changed by charging the standard 814. Because the first and second scanner units 801 and 872 are mounted on the same carriage 811 and operate the same recording unit 888, no mechanical errors are introduced during a scanning operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for monitoring the spacing of a plurality of elements arranged in a series, which comprises:
   means for directing a beam of radiation toward one of the elements;
   drive means for causing relative movement at a selected rate between the elements and said directing means to render the elements effective to modify said beam of radiation and produce a train of pulses of radiation at a rate indicative of the spacing of the elements;
   recording means having a section for receiving marks, the reception of said marks by said section being indicative of a predetermined spacing of the elements;
   means actuated by said drive means at a rate proportional to said selected rate for cyclically conditioning said section for reception of said marks; and
   means responsive to said train of pulses for marking said conditioned section to indicate conformity of the spacing of the elements to said predetermined spacing.

2. Apparatus according to claim 1, which comprises:
   means for mounting the elements in a common plane and extending in a given direction; and
   said directing means comprising a coiled filament having a longitudinal axis, means for mounting said filament with said longitudinal axis extending parallel to said given direction, means for energizing said filament to generate said beam of radiation, said beam of radiation having a high intensity portion extending parallel to said given direction, and means for focusing said beam of radiation onto said common plane.

3. Apparatus for monitoring the spacing between a plurality of elements arranged along a given path, which comprises:
   means for directing a beam of radiation toward one of the elements;
   drive means for causing relative movement at a selected rate between the elements and said beam of radiation to direct said beam of radiation toward successive ones of the elements in said path, the elements being effective upon such relative movement to produce a succession of measurable changes in said beam of radiation, said succession of measurable changes being produced at a rate indicative of the spacing between the elements;
   recording means having a series of sections for receiving marks, the reception of marks by various sections of said series being indicative of various predetermined spacing of the elements;
   means actuated by said drive means at a rate proportional to said selected rate for successively conditioning said sections for reception of said marks; and
   means responsive to said measurable changes for applying marks to said conditioned sections according to the spacing between the elements.

4. Apparatus for monitoring the relative spacing of a plurality of opaque elements arranged in a series along a given path, which comprises:
   means for directing a beam of radiation toward one of the elements;
   drive means for causing relative movement along said given path at a selected rate between the opaque elements and said directing means to render the opaque elements effective to modify said beam of radiation and produce a train of pulses of radiation at a pulse rate indicative of the relative spacing of said opaque elements;
   recording means including a record having a first area for reception of first marks indicative of conformity of the spacing of the opaque elements to selected specifications, said record having second and third areas spaced by the first area for reception of second and third marks indicative of nonconformity of the spacing of the opaque elements to said specifications;
   means actuated by said drive means for successively conditioning said first, second and third areas for reception of said respective first, second, and third marks; and
   marking means for applying said marks to said recording means, said marking means being responsive to a train of pulses produced in response to a first series of the opaque elements spaced in conformity to said specifications for applying said first marks to said conditioned first area of said recording means to indicate said conformity of the first series of opaque elements, said marking means being responsive to a train of pulses produced in response to a second series of the opaque elements spaced other than in conformity to said specifications for applying said second and third marks to said respective conditioned second and third areas to indicate said nonconformity.

5. Apparatus for indicating the spacing between a plurality of wires normally spaced by a given distance, which comprises:
  means for mounting the wires in a common plane;
  means for projecting a beam of radiation toward one side of the plane;
  a recording ribbon having a first area for receiving marks indicative of the normal spacing of the wires;
  means for conditioning the first area of the recording ribbon for recepton of the marks;
  drive means for operating said conditioning means so that said first area is conditioned at successive moments spaced by a given interval;
  means operated by said drive means in synchronism with said operation of said conditioning means for causing relative movement between said projecting means and the normally spaced wires so that said beam of radiation is modified at successive moments corresponding to the successive moments when said ribbon is conditioned for receiving one of said marks on said first area; and
  means responsive to said modification of said beam of radiation for marking said successively conditioned first area of said ribbon to indicate the normal spacing of the wires.

6. Apparatus for measuring the distance between a plurality of spaced, opaque elements supported by an article having a transparent portion, adjacent elements of a first group of the elements being spaced by a given distance, adjacent elements of a second group of the elements being spaced by a random distance, which comprises:
  means for directing a beam of radiation from a first side of the article through the portion of the article for interception by the opaque elements;
  drive means for causing relative movement along a given path at a given rate between said directing means and said opaque elements so that the first group of the elements intercept said beam at a first interception rate and the second group of the elements intercept said beam at a second interception rate;
  recording means for receiving marks, said recording means having a datum line and at least one section displaced from the datum line, reception of marks by said section being indicative of said random spacing of the elements of the second group, reception of marks on said datum line being indicative of spacing of the elements of the first group by said given distance;
  anvil means driven by said drive means at a rate proportional to said given rate, said anvil means having a surface advanced cyclically past said section and said datum line;
  scanning means supported by said drive means on a second side of the article opposite to said first side, said scanning means being responsive to interception of said beam by the elements for producing successive signals at first and second signal rates corresponding to the interception of said beam at said respective first and second interception rates; and
  striker means actuated by said signals for urging said recording means against said anvil means to produce marks on said recording means, actuation of said striker means at said first signal rate being effective to produce marks on said datum line, actuation of said striker means at said second signal rate being effective to produce marks on said section.

7. Apparatus for testing the conformity of an article to selected specifications, the article including a transparent portion and opaque, electrically conductive strands carried by the article in generally parallel relationship, wherein strands conforming to the selected specifications are spaced by equal distances measured along a transverse axis of the article which apparatus comprises:
  means for mounting the article with the opaque strands in a common plane;
  first and second frames mounted on opposite sides of the article for movement parallel to the transverse axis of the article;
  radiation means mounted on said first frame for projecting a beam of radiation along a given path through the transparent portion;
  drive means for moving said first frame to cause said beam of radiation to scan the article and pass through the transparent portion to the opposite side of the article in the form of a series of shadows and radiation pulses, said series of shadows and pulses being random when the spacing between the strands does not conform to the selected specifications;
  means mounted on said second frame and responsive to said shadows for generating a series of signals, said series of signals being random when the spacing between the strands does not conform to the selected specifications;
  a recording tape having a reference axis, an axis perpendicular to said reference axis, and an area displaced from said reference axis in the direction of said transverse axis, said area being receptive to marks indicative of spacing between the strands which does not conform to the selected specifications;
  a marking unit having first and second members straddling said recording tape, said first member having a marking surface movable parallel to said perpendicular axis across said area and said reference axis;
  means operated by said drive means for moving said first member and said first frame in synchronism to align said marking surface with said reference axis simultaneously with the formation of a shadow by a conforming strand and to position said marking surface opposite to said displaced area at all other times; and
  means responsive to said random series of signals for repetitively moving said second member toward said first member to impart marks to said area of said recording tape.

8. Apparatus for testing a cable having parallel electrical conductors embedded in a transparent carrier, which comprises the combination of:
  a watch-rate recorder including a record sheet, means for feeding said record sheet, means for amplifying an electrical signal to produce an output signal, printer means actuated in response to said output signal for advancement toward said record sheet, and helical anvil means for restraining movement of said record sheet upon said advancement of said printer means to mark said record sheet;
  scanner means including means for projecting a focused light beam through the transparent carrier for interruption by each of the electrical conductors, and means for generating said electrical signals in response to each of said interruptions of said focused light beam; and
  unitary drive means for advancing said scanner means across said carrier to cause said electrical conductors to interrupt said focused light beam and for driving said helical anvil means in synchronism with said advancement of said scanner unit to position said helical anvil means adjacent to a predetermined portion of said record sheet when said focused light beam is interrupted by one of the electrical conductors.

9. Apparatus for monitoring a cable to detect the relative position of a pair of parallel wires embedded between adjoining faces of a pair of transparent support layers, which comprises:

a table for mounting the cable with said adjoining faces in a common plane;
a scanner unit including:
   a light source for focusing a light beam onto said common plane for passage through the cable, and a light sensitive device responsive to said light beam passing through the cable for generating an electrical signal, said device being effective to generate successive signals in response to successive interruptions of said light beam;
a printing mechanism including a rotary helix, a strip of pressure sensitive recording paper, and a printer bar for pressing said strip against a portion of said helix to mark said strip;
means for rotating said helix and simultaneously moving said scanner unit relative to the cable so that the wires cause said successive interruptions of said focused light beam; and
a record control circuit responsive to said successive signals for successively actuating said printer bar to successively mark said strip and indicate the relative position of the wires.

10. Apparatus for indicating the spacing of wires embedded in a transparent sheet, which comprises:
a lamp for projecting a focused beam of light toward the sheet;
a carriage for moving said lamp across the sheet so that successive ones of the wires successively interrupt said focused beam of light;
a light sensitive head moved by said carriage and responsive to interruption of said focused beam of light for generating a succession of signals indicative of the relative spacing of the wires;
a printing mechanism including a rotary, helical anvil member, a strip of pressure sensitive recording paper, and a striker for pressing the strip of paper against said helical anvil member to mark said strip of paper;
common drive means for rotating said helical anvil member and advancing said carriage in synchronism so that said helical anvil member is adjacent to a predetermined part of said paper at given moments; and
circuit means responsive to the succession of signals generated upon interruption of said focused beam of light by acceptable wires having a given spacing for operating the striker at said given moments to mark said strip of paper and indicate the given spacing of the wires.

11. Apparatus for testing a transparent cable to determine if selected distances are provided between generally parallel, opaque wires of the cable, the cable having a longitudinal axis extending parallel to the wires and a transverse axis extending perpendicular to the wires, which apparatus comprises:
a bed for supporting the cable with the wires in a common plane;
a rigid frame having guide surfaces;
a carriage mounted on the guide surfaces, said carriage including a first arm extending on one side of the cable and a second arm extending on a second side of the cable;
a light source mounted on said first arm for focusing a light beam onto said common plane of the wires, said focused light beam normally passing through the cable, passage of said focused light beam through the cable being interrupted upon focusing of said light beam on one of the wires;
a light responsive unit mounted on said second arm for generating signals in response to interruptions of said focused light beam;
a pressure sensitive recording tape having a first axis, a second axis and a central area extending parallel to said first axis;
a rotary anvil, said anvil having a helical surface adapted to advance in a path parallel to said second axis of said tape across said central area upon rotation of said anvil, said helical surface being effective to restrain movement of said tape perpendicular to said first and second axes;
common drive means for rotating said anvil and moving said carriage in synchronism, said synchronous rotation of said anvil being effective to advance said helical surface across said central area of said tape at selected moments spaced by equal intervals, said synchronous movement of said carriage being effective to cause the wires spaced by the selected distance to interrupt said focused light beam at given moments corresponding to the selected moments to render said light-responsive unit effective to generate one of said signals at each of said selected moments;
striker means actuated by each of said signals for advancing said tape against said advancing helical surface to mark said central area of said tape; and
means for advancing said pressure sensitive tape relative to said striker and said surface to render said central area of said tape receptive to a series of marks indicative of provision of the selected distance between the parallel wires.

12. Apparatus for monitoring the spacing between a pair of parallel wires centered on a common plane within a transparent sheet provided with parallel outer faces, wherein a first light beam projected perpendicularly toward one of said outer faces and into said sheet onto a first wire of said pair of wires is reflected around said first wire by said pair of wires and said faces; which comprises:
means for mounting said sheet with said wires in said common plane and extending in a given direction;
a carrriage movable along a predetermined path extending perpendicular to said given direction;
projecting means mounted on said carriage, said projecting means including a lamp provided with a coiled filament having an axis extending parallel to said wires for projecting a second beam of light, and means for focusing said second beam of light toward said first wire and said common plane of said wires to preclude reflection of said second light beam around said first wire;
photosensitive means mounted on said carriage, said photosensitive means including means focused on said common plane for projecting an image of said second beam of light focused on said common plane, said photosensitive means being responsive to said projected image for generating a pulse;
drive means for advancing said carriage along said predetermined path to cause said photosensitive means to generate a series of said pulses;
printing means including a record strip adapted to receive marks, said printing means being operated by said drive means in synchronism with said advancement of said carriage for conditioning said record strip for reception of said marks; and
striker means responsive to said series of signals for impressing said marks on said record strip to indicate the spacing of said wires.

13. Apparatus for monitoring the relative spacing of a series of opaque, spaced elements, which comprises:
standard means having a series of opaque, spaced members thereon, the spacing of said members being in a predetermined relationship to a desired spacing of said elements;
means for mounting the spaced elements and said standard means in spaced relationship with said elements and said members extending in a given path;
means for directing a first beam of radiation toward one of said elements and a second beam of radiation toward one of said members;
drive means for causing relative movement perpendicular to said given path and at a selected rate between said mounted elements and members and said directing means to render said elements effective to interrupt said first beam of radiation and produce a first train of pulses of radiation at a pulse rate indicative of the relative spacing of said elements, said relative movement rendering said members effective to interrupt said second beam of radiation to produce a second train of pulses of radiation at a pulse rate indicative of acceptable spacing of said elements;

means actuated by said drive means for scanning said record to condition selected portions of said area for reception of said marks; and marking means for applying said marks to said recording means, said marking means being responsive to said first train of pulses for applying a first series of marks to a first conditioned portion of said area, said marking means being responsive to said second train of pulses produced in response to said members of said standard means for applying a second series of marks to a second conditioned portion of said area to indicate conformity of the spacing of said elements to said desired spacing.

14. Apparatus for measuring the distance between a plurality of spaced, opaque elements supported by a transparent article, which comprises:

transparent means having a series of opaque members mounted thereon in a given pattern;

means for mounting the article and said transparent means in spaced relationship;

means for directing a first beam of radiation from a first side of the article through the article for interception by the opaque elements, said means directing a second beam of radiation from a first side of said transparent means through said transparent means for interception by said opaque members;

drive means for causing relative movement between said directing means and said mounted article and transparent means at a given rate to cause the elements to intercept said first beam at a variable interruption rate indicative of the spacing of the elements and to cause said opaque members to intercept said second beam at a given interruption rate;

recording means for receiving marks, said recording means having a central section and at least one marginal section displaced from the central section, reception of marks by said marginal section being indicative of unacceptable spacing of the elements, reception of marks by said central section being indicative of acceptable spacing of the elements;

anvil means driven by said drive means at a rate proportional to said given rate, said anvil means having a surface advanced cyclically past said central and said marginal sections;

scanning means supported by said drive means on a second side of the article and said transparent means, said scanning means being responsive to interception of said first beam by the elements for producing a first series of signals at a variable signal rate corresponding to the spacing of the elements, said scanning means being responsive to interception of said second beam by said members for producing a second series of signals at a given signal rate; and striker means actuated by said first and second series of signals for urging said recording means against said anvil means to produce marks on said recording means, actuation of said striker means at said variable signal rate being effective to produce marks on said central section and said marginal section according to the spacing of the elements, actuation of said striker means at said given signal rate being effective to produce a series of marks on said recording means for defining a boundary between said central and marginal sections to indicate acceptable and defective spacing of the elements.

15. Apparatus for indicating the spacing between a series of opaque elements mounted on an article, which comprises:

transparent standard means having a plurality of spaced, opaque members formed thereon, said members being spaced in a predetermined relationship to a desired spacing between the elements;

means for mounting the article and said standard means in spaced relationship in a common plane;

first means for projecting a first beam of radiation toward said article;

second means for projecting a second beam of radiation toward said standard means;

common mounting means for supporting said first and second projecting means relative to said respective article and standard means;

a recording ribbon for receiving marks indicative of the spacing of the elements;

anvil means having a helical portion for conditioning said ribbon to receive said marks;

common drive means for causing relative movement along a given path at a given rate between said common mounting means and said mounted article and standard means to render the elements effective to interrupt said first light beam and to render said opaque members effective to interrupt said second light beam;

means driven by said common drive means for operating said conditioning means in synchronism with said relative movement between said common mounting means and said mounted article and standard means;

photosensitive means responsive to said interruption of said first light beam by the opaque elements for generating a first series of signals indicative of the spacing of the opaque elements;

second photosensitive means responsive to said interruption of said second light beam by said opaque members for generating a second series of signals indicative of said desired spacing of said opaque elements; and means responsive to said first and second series of signals for applying to said recording ribbon respective first and second series of marks, said first series of marks being indicative of the spacing between the opaque elements, said second series of marks defining an area along said recording ribbon for reception of marks of said first series of marks to indicate acceptable spacing of the opaque elements.

No references cited.

RALPH G. NILSON, *Primary Examiner.*

MARTIN ABRAMSON, *Assistant Examiner.*